United States Patent
Kalsi et al.

[11] Patent Number: 6,120,036
[45] Date of Patent: *Sep. 19, 2000

[54] EXTRUSION RESISTANT HYDRODYNAMICALLY LUBRICATED ROTARY SHAFT SEAL

[75] Inventors: Manmohan S. Kalsi, Houston; Lannie Dietle, Sugar Land, both of Tex.

[73] Assignee: KALSI Engineering, Inc., Sugar Land, Tex.

[*] Notice: This patent is subject to a terminal disclaimer.

[21] Appl. No.: 09/014,118

[22] Filed: Jan. 27, 1998

Related U.S. Application Data

[63] Continuation-in-part of application No. 08/582,086, Jan. 2, 1996, Pat. No. 5,738,358.

[51] Int. Cl.[7] .................................................. F16J 15/32
[52] U.S. Cl. ........................ 277/559; 277/544; 277/556
[58] Field of Search ..................................... 277/559, 598, 277/650, 651

[56] References Cited

U.S. PATENT DOCUMENTS 5,738,358  4/1998  Kalsi et al. ........................... 277/544

*Primary Examiner*—Anthony Knight
*Assistant Examiner*—Karlena D. Schwing
*Attorney, Agent, or Firm*—James L. Jackson; Mayor, Day, Caldwell & Keeton L.L.P.

[57] ABSTRACT

A hydrodynamically lubricated interference type rotary shaft seal suitable for environmental exclusion and high pressure lubricant retention which incorporates composite multiple modulus construction and a non-planar flexible environmental edge heel geometry which cooperate to resist high pressure extrusion damage while minimizing interfacial contact pressure and accommodating radial shaft motion.

26 Claims, 7 Drawing Sheets

EXTRUSION RESISTANT HYDRODYNAMICALLY LUBRICATED ROTARY SHAFT SEAL

This is a continuation-in-part of application Ser. No. 08/582,086, filed on Jan. 2, 1996 now U.S. Pat. No. 5,738,358 by Manmohan S. Kalsi and Lannie Dietle and entitled Extrusion Resistant Hydrodynamically Lubricated Multiple Modulus Rotary Shaft Seal.

FIELD OF THE INVENTION

This invention relates generally to hydrodynamically lubricated type rotary shaft seals that are suitable for environmental exclusion and for maintaining a film of lubricant at the dynamic interface of such seals with a rotary shaft surface. More particularly the present invention is directed to hydrodynamically lubricated rotary shaft seals that are suitable for environmental exclusion from the dynamic interface and are also suitable for high pressure lubricant retention through employment of extrusion resistant geometry.

BACKGROUND OF THE INVENTION

FIGS. 1, 2, 2A, 3 and 4 of this specification represent prior art which is described herein to convey the distinction between prior art seals and the present invention.

Referring now to the prior art of FIG. 1 there is shown a cross-sectional view of a hydrodynamically lubricated interference type rotary shaft sealing assembly generally at 1 including a housing 2 from which extends a rotary shaft 3. The housing defines an internal seal installation groove or gland 4 within which is located a ring shaped hydrodynamic rotary shaft seal 5 which is constructed in accordance with the principles of U.S. Pat. Nos. 4,610,319 and 5,230,520, and which is shown in greater detail in FIGS. 2, 2A and 3. The hydrodynamic seal separates the lubricant 6 from the environment 7, and prevents intermixing of the lubricant and the contaminant matter present in the environment.

FIG. 2 represents the radially uncompressed cross-sectional shape of the prior art seal 5, FIG. 2A represents the cross-sectional configuration of the prior art seal 5 when located within its seal groove and radially compressed between the outer diameter 14 of the rotary shaft 3 and the radially outer wall 11 of the seal groove, and FIG. 3 shows the footprint made by the dynamic sealing lip 12 against the shaft. The environment usually contains highly abrasive particulate matter in a fluid; an example of such an environment would be oil field drilling fluid. From an overall orientation standpoint, the end of the seal which is oriented toward the lubricant is surface 8 and the end of the seal which is oriented toward the environment 7 is surface 9. When the seal 5 is installed in the circular seal groove or gland 4, a circular radially protruding static sealing lip 10 is compressed against a counter-surface 11 of the groove per the teachings of U.S. Pat. No. 5,230,520. At the inner periphery of the circular sealing element 5 there is provided an inner circumferential sealing lip 12 that defines a dynamic sealing surface 13 that is compressed against a cylindrical sealing surface 14 of the rotatable shaft 3. The circular seal groove or gland 4 is sized to hold the resilient circular sealing element 5 in radial compression against the cylindrical sealing surface 14 of the shaft 3, thereby initiating a static seal with the housing and shaft in the same manner as any conventional interference type seal, such as an O-Ring. When shaft rotation is not present, a liquid tight seal is maintained at the static sealing interface between the static sealing lip 10 and the mating counter-surface 11 of the seal groove, and between the dynamic sealing lip 12 and the cylindrical sealing surface 14 of the shaft.

When shaft rotation takes place, the hydrodynamic seal remains stationary with respect to the housing, and maintains a static sealing interface with said housing, while the seal-to-shaft interface becomes a dynamic sealing interface. The inner peripheral surface of the seal inner lip 12 incorporates a geometry that promotes long seal life by hydrodynamically lubricating the dynamic seal-to-shaft interfacial zone, and by excluding environmental contaminates from the seal to shaft interface. Seal lip 12 incorporates a wavy edge 15 on its lubricant side, and an abrupt circular edge 16 on its environmental side per the teachings of U.S. Pat. No. 4,610,319. For the purpose of orienting the reader, the radial cross-section of all seal cross-sectional figures herein is taken at a circumferential location which represents the average width of the wavy dynamic sealing lip contact shown in FIG. 3. As relative rotation of the shaft takes place, the wavy edge 15 on the lubricant side of the dynamic sealing lip, which has a gradually converging relationship with the shaft, generates a hydrodynamic wedging action that introduces a lubricant film between the seal inner surface 13 and the cylindrical sealing surface 14 of the shaft per the teachings of U.S. Pat. No. 4,610,319. This lubricant film physically separates the seal and the shaft, and thereby prevents the typical dry rubbing type frictional wear and heat damage associated with conventional non-hydrodynamic interference type seals, and thereby prolongs seal life and mating shaft surface life and makes higher service pressures practical. This hydrodynamic action, which is described in detail in U.S. Pat. No. 4,610,319, can more easily be understood by referring to FIG. 3, which shows a flat development of the cylindrical sealing surface 14 of the shaft, and which depicts the footprint of the dynamic inner lip 12 of the seal against the cylindrical sealing surface 14 of the shaft. From an orientation standpoint, the lubricant is shown at 6, the seal footprint is shown at 17, and the environment is shown at 7. The lubricant side of the footprint has a wavy edge 18 created by the wavy edge 15 of the seal, and the mud side of the footprint has a straight edge 19 created by the abrupt circular corner 16 of the seal. The lubricant is pumped into the dynamic sealing interface by the normal component VN of the rotational velocity V.

Referring again to FIG. 2 and FIG. 2A, the abrupt circular corner 16 of the environmental side of the hydrodynamic is not axially varying, and does not generate a hydrodynamic wedging action with the environment in response to relative rotary motion, and thereby functions to exclude particulate contaminants from the seal-to-shaft interface per the teachings of U.S. Pat. No. 4,610,319.

The illustration of FIGS. 2 and 2A illustrates the customary type of general purpose hydrodynamic rotary shaft seal that positions and configures the exclusionary edge 16 and the environmental end 9 of the seal 5 in such a manner that lip 12 is largely supported by the environment-side gland wall 20 in a manner that resists distortion and extrusion of seal material when the seal is subjected to the hydrostatic force resulting from the lubricant pressure acting over the annular area between the static sealing interface and the dynamic sealing interface. Such force occurs when the lubricant pressure is higher than the environment pressure. FIGS. 1 and 2A illustrate the seal being forced against the environment-side gland wall 20 by hydrostatic force resulting from the lubricant pressure acting over the area between the static sealing interface and the dynamic sealing interface.

The static sealing lip 10 has generally the same cross-sectional geometry as the average cross-sectional configuration of the dynamic sealing lip 12 except that it is shorter. Because both lips have the same general shape and axial location, when the seal is compressed, the interfacial contact force profiles and deformation of the two lips are very similar in both their magnitude and axial location per the teachings of U.S. Pat. No. 5,230,520, and as a result, there is no gross tendency for the seal to twist counter-clockwise within the gland in the absence of lubricant pressure. The magnitude of projection 21 is designed so that lip 10 is flattened out against mating counter-surface 11 of the gland upon installation so that contact between the outer periphery of the seal and the gland surface provides mechanical stability against seal twisting in unpressurized applications. The magnitude of projection 12 is designed to be larger than projection 21 so that dynamic lip 22 is not overly flattened and deformed against the shaft upon installation so as to preserve the form and function of the hydrodynamic inlet geometry 15.

DESCRIPTION OF THE PROBLEM

When a condition of elevated lubricant pressure exists, the hydrostatic force resulting from the lubricant pressure acting over the area between the static sealing interface and the dynamic sealing interface drives the seal against the environment side gland wall, as shown by FIG. 2A. The abrupt circular exclusion edge 16 is located at the extreme end of the environmental side of the seal. Since the shape of the environmental end of the seal is of the same planar shape as the environmental gland wall, the environmental end of the seal is generally well supported against the lubricant pressure at all locations except clearance gap 26 which exists between the housing 2 and shaft 3. This clearance gap, which is commonly called the "extrusion gap", must be kept relatively small so that the relatively low modulus seal material can bridge the gap and resist the force resulting from the lubricant pressure acting over the unsupported area of the extrusion gap. At some level of elevated lubricant pressure, the portion of the seal adjacent to extrusion gap 26 begins to locally bulge or protrude in to the extrusion gap. This phenomenon is commonly called "extrusion" by the seal industry, and is inherent to interference type seals, including the hydrodynamic rotary shaft seal. (Extrusion is not illustrated in FIG. 2A.)

The magnitude of extrusion is directly dependent upon several factors, including the size of the extrusion gap, the lubricant pressure, and the modulus of the seal material. The modulus of the seal material decreases with temperature, which reduces extrusion resistance. In high pressure sealing applications, extrusion can lead to severe fatigue damage known as "nibbling" or "extrusion damage", which can cause seal material loss and thereby significantly reduce the operational life of the seal. Extrusion damage is caused by cyclic stressing of the seal material which protrudes into the extrusion gap, which ultimately causes the protruding material to fatigue and break away from the sealing element. The cyclic stress which causes extrusion damage is induced by several factors described here-after. Dynamic fluctuations in the size of the extrusion gap due to lateral shaft motion (and other factors) causes high variations in the radial compression of the extruded material, and the resulting cyclic stress causes extrusion damage which looks as if tiny bites have been "nibbled" out of the environmental side of the seal. Lubricant pressure fluctuations cause cyclic stress induced extrusion damage by causing fluctuations in the magnitude of extrusion, and by causing fluctuations in the size of the extrusion gap due to "breathing" (pressure related expansion and contraction) of the housing. Experience has shown that extrusion damage is significantly accelerated by the presence of roughness (such as nicks, burrs, or poor surface finish) at the intersection 27 between the environmental side gland wall 20 and the housing bore 28, because said roughness causes the extruded material to incur a high local stress concentration that accelerates fatigue damage. Extrusion related fatigue damage to the environmental side of the seal can cause eventual seal failure by several different mechanisms. In severe cases, the seal fails catastrophically due to gross material loss. In less severe cases, localized nibbling can promote the ingestion of environmental abrasives into the dynamic interface and cause eventual seal failure due to wear, and can also disrupt the hydrodynamic film which may cause the seal to run hotter and suffer from premature compression set and heat-related surface embrittlement.

Although the useful operating pressure range of the present day hydrodynamic rotary shaft seal is unequaled by any other interference type rotary seal, the pressure range is ultimately limited by susceptibility of the seal to extrusion damage. Several applications, such as the oilfield rotary blowout preventer, the oilfield downhole drilling mud motor, and pumps for abrasive slurries, would benefit significantly from a rotary seal having the ability to operate at a higher pressure, or having the ability to operate with a larger shaft to housing extrusion gap and tolerate larger lateral shaft motion. Unfortunately, one cannot simply increase the overall durometer hardness of the hydrodynamic rotary shaft seal to a very high value to obtain the high modulus needed for increased extrusion resistance because under initial radial compression the high modulus would cause a very high contact pressure at the dynamic sealing interface that would be incompatible with hydrodynamic lubrication, and sustained rotary operation would not be practical due to a high resulting level of self-generated heat. The contact pressure at the seal to shaft interface is one of the most important factors relating to hydrodynamic performance of the seal because it influences film thickness.

As previously stated, hydrodynamic seals are installed with initial radial compression to establish a static seal in the same manner as an O-Ring. A certain minimum level of initial compression is required so that the seal can accommodate normal tolerances, eccentricities, shaft lateral displacement, and seal compression set without loosing contact with the shaft. The contact pressure at the dynamic sealing interface is a function of the percentage of compression times the modulus of elasticity of the seal material, therefore the choice of modulus is limited by the required percentage of initial compression and by the maximum practical interfacial contact pressure. In practice, this has meant that the prior art general purpose hydrodynamic seal has been restricted to materials having a durometer hardness of about 90 Shore A, which corresponds to a modulus of elasticity of about 2,600 psi.

The small seal to shaft extrusion gap clearance required for high pressure operation with present day hydrodynamic seals is difficult to implement unless special mechanical contrivance such as the force-balanced laterally translatable seal carrier of U.S. Pat. No. 5,195,754 is used. Shaft elastic deflection and lateral articulation within bearing clearances due to side load often exceed the required seal to housing extrusion gap, and the resulting rotary metal to metal contact between the shaft and the housing damages the shaft and housing and generates frictional heat that can melt the seal and cause failure. An interference type hydrodynamically lubricated rotary shaft seal having higher extrusion resistance so as to be able to tolerate larger extrusion gaps and increased lateral shaft motion is therefore highly desirable.

Another alternative embodiment of prior art hydrodynamic seals is the hydrodynamic seal 30 illustrated in FIG. 4 which is a specialized design used only in roller cone drill bits. The seal 30 defines a static sealing surface 32 which contacts against a mating counter-surface 50 of the gland 52, and defines an environmental side 34 which faces the drilling fluid of the environment, and defines a lubricant side 36 which faces the lubricant of the bit. A corner chamfer 31 is incorporated to clear gland radius 51. The seal also includes a dynamic sealing lip 38 which defines a dynamic sealing surface 40 for contact with the shaft 41. The dynamic sealing lip has a hydrodynamic geometry 42 on the lubricant side and an abrupt circular exclusionary geometry 44 on the environmental side per the teachings of U.S. Pat. No. 4,610,319. The step 48 and laterally offset relationship between the environmental end of the seal 34 and the abrupt exclusionary geometry 44 is dictated by the need to clear a large shaft radius 46. The hydrodynamic bit seal 30 is used in substantially pressure balanced service where the lubricant pressure is approximately equal (within about ±200 psi) to the environmental pressure. Although the bit seal 30 is suitable for applications where the lubricant pressure is nominally balanced to that of the environment, it is completely unsuitable for high lubricant pressure applications because the dynamic lip is not supported against deformation by the gland wall due to the large size of step 48, and because the modulus of the seal is limited to relatively low values by the above described need to limit interfacial contact pressure resulting from radial compression of the seal, and because the diameter of installed corner 39 is approximately the same as gland corner 49. Owing to the initial installed location of corner 39 relative to gland corner 49, pressure induced extrusion will cause corner 39 to sustain damage as it extrudes past corner 49 into the extrusion gap. If the bit seal 30 were exposed to high lubricant pressure, the seal would be driven to the environmental side gland wall 54. Owing to large step 48, initial seal contact with the gland wall would occur at a diameter which is substantially larger than the shaft sealing interface. The hydrostatic pressure acting over the relatively large unsupported area between the initial wall contact and the shaft contact would exert a large axial hydraulic force on the dynamic lip 38 of the seal, and as a result the lip 38 would undergo radical distortion as the lubricant pressure forced the lip toward the environment. Such gross distortion would prevent hydrodynamic lubrication of the dynamic interface, and would therefore result in rapid failure of the seal due to wear from direct unlubricated contact with the shaft, and due to rapid extrusion damage from severe heat-related softening of the elastomer. The laterally offset relationship between the environmental end of the seal 34 and the abrupt exclusionary geometry 44 of the hydrodynamic bit seal 30 is totally unsuitable for high pressure lubricant retention because the chamfer is so large, and because the modulus of the seal must be kept relatively low so that the interfacial contact pressure resulting from initial radial compression is kept within a useful range. Said low modulus material is incapable of resisting severe distortion and extrusion when exposed to high lubricant pressure, and even more so when as in the case FIG. 4, the seal is not well supported by the gland. The special purpose seal of FIG. 4 was not designed as a high pressure seal, and cannot function as one.

BRIEF DESCRIPTION OF THE DRAWINGS

So that the manner in which the features, advantages, and objects of the present invention are attained and can be understood in detail, a comprehensive description of the invention may be had by reference to the embodiments thereof which are illustrated in the appended drawings. It is to be noted, however, that the appended drawings only illustrate typical embodiments of this invention, and are therefore not to be considered limiting of its scope.

IN THE DRAWINGS

Figure 1:
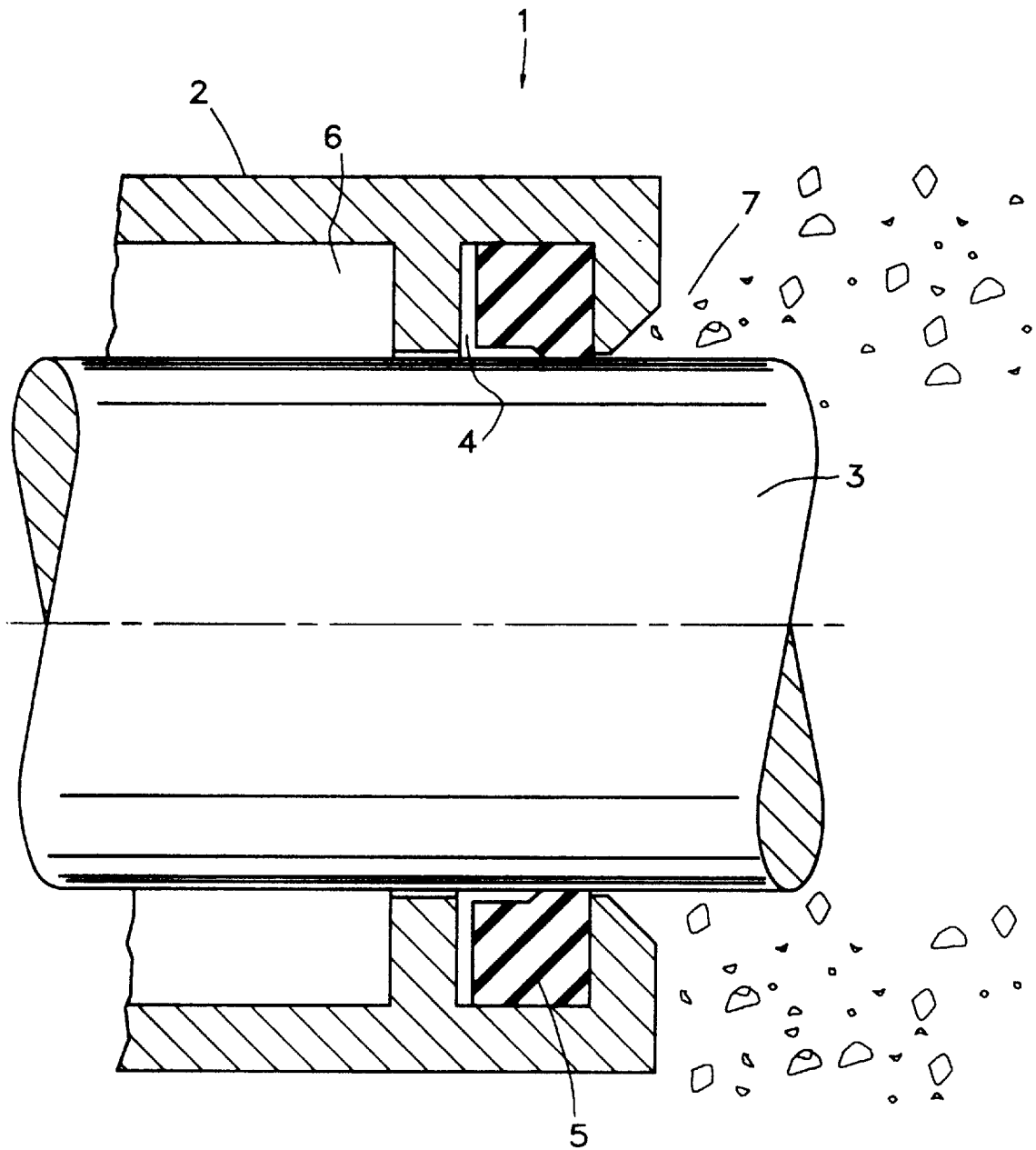

FIG. 1 is a partial cross-sectional illustration of a housing and rotary shaft arrangement incorporating a hydrodynamic seal representative of prior art.

Figures 2, 2A:
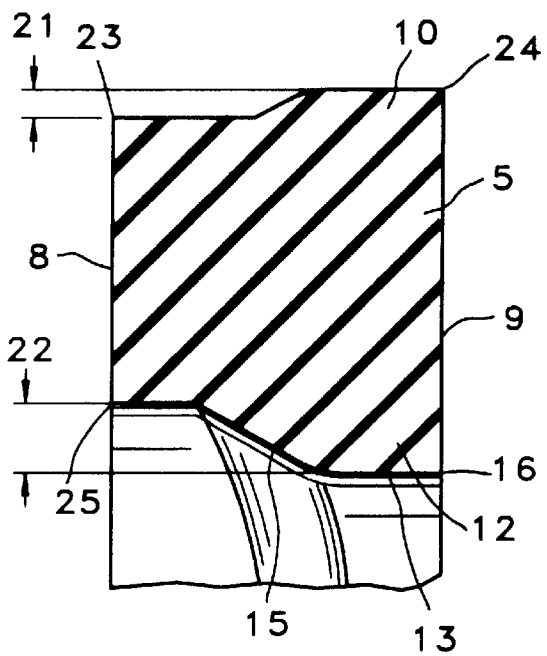

FIGS. 2 and 2A are fragmentary sectional views of a general purpose hydrodynamic seal representing the prior art, the seal being shown in the uncompressed condition thereof in FIG. 2, and shown in FIG. 2A to be located in radially compressed condition within a sealing gland and establishing hydrodynamic sealing engagement with a rotary shaft in the presence of lubricant pressure.

Figure 3:
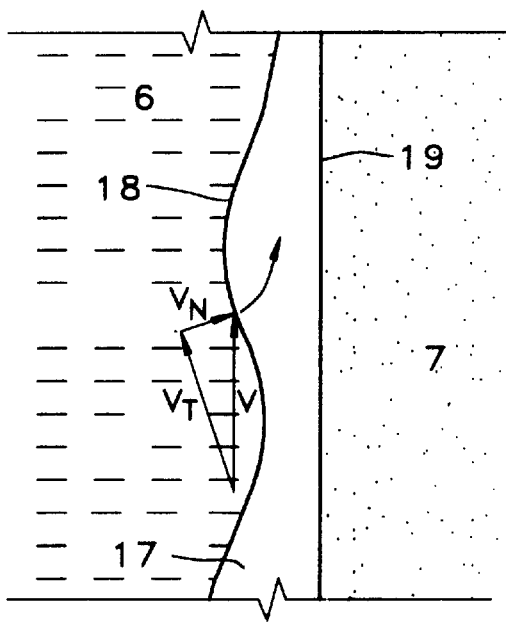

FIG. 3 is a flat development which represents the footprint configuration of the sealing interface of a hydrodynamic seal, and which illustrates the operating principle of the hydrodynamic wedging or pumping action thereof.

Figure 4:
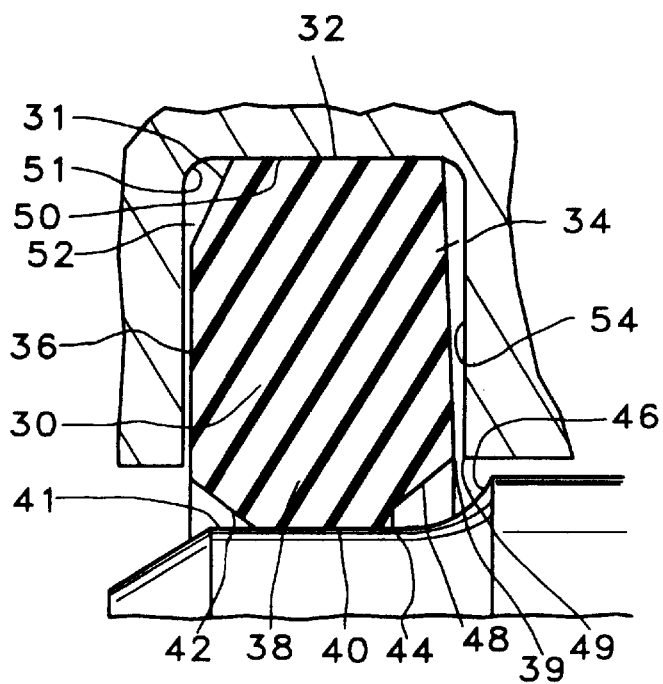

FIG. 4 is a fragmentary sectional view of a hydrodynamically lubricated, low pressure special purpose bit seal representing prior art.

Figure 5:
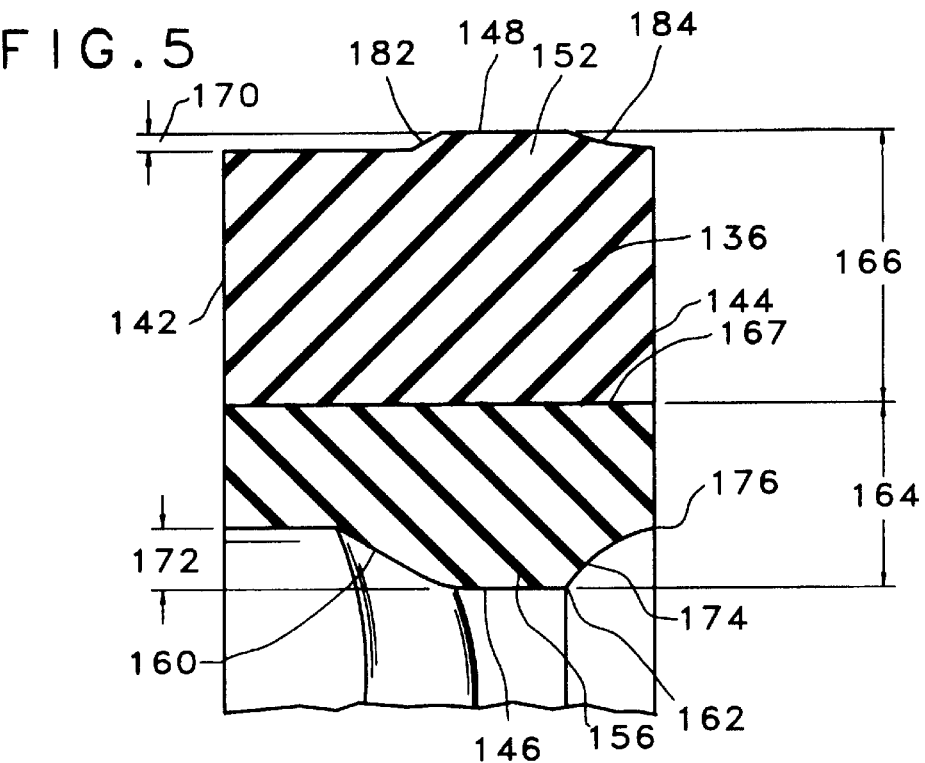
Figure 5A:
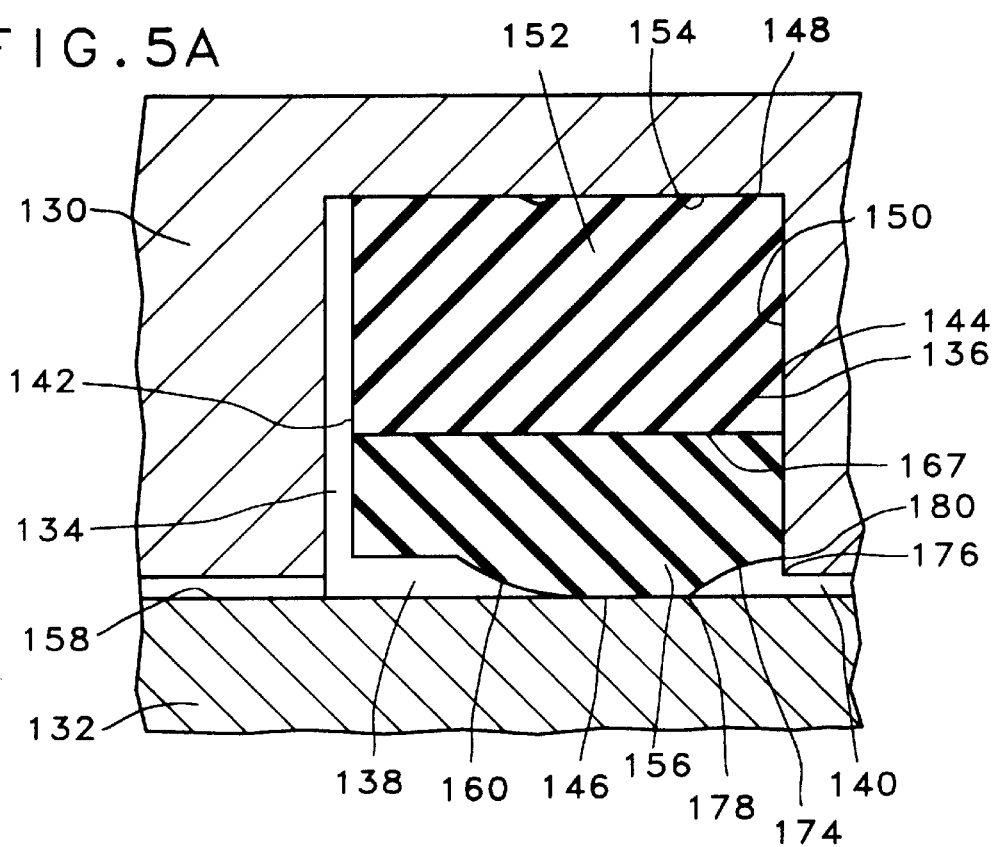

FIGS. 5 and 5A are fragmentary cross-sectional illustrations of a hydrodynamic rotary shaft seal representing the preferred embodiment of the present invention, with FIG. 5 showing the uncompressed condition of the seal, and FIG. 5A representing the compressed condition of the seal within the gland when exposed to lubricant pressure.

Figure 6:
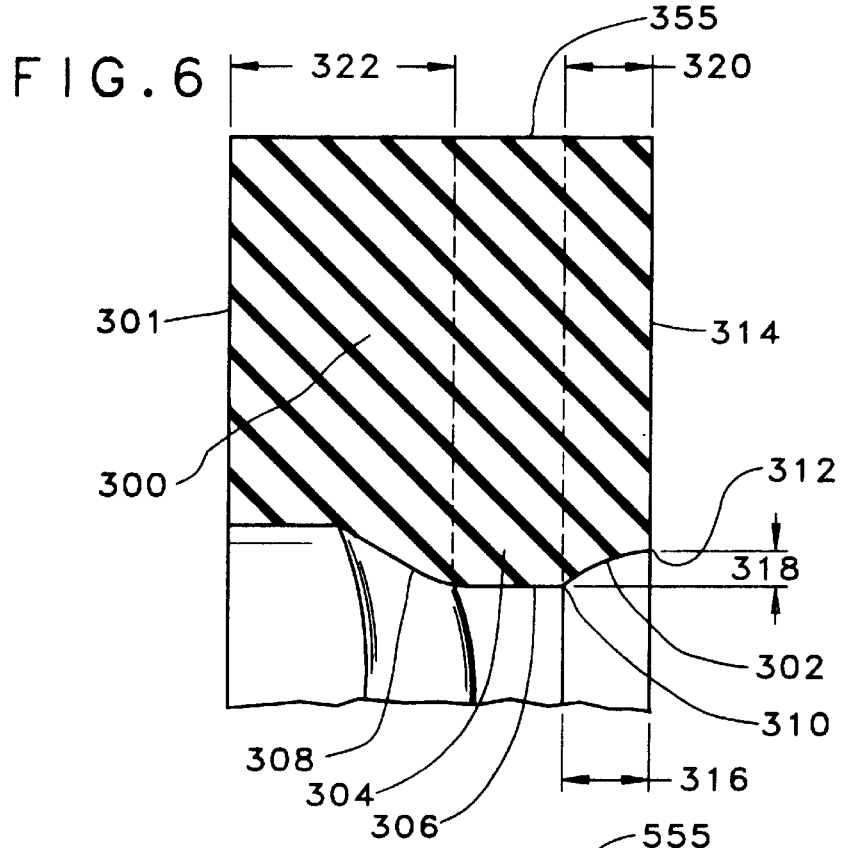

FIG. 6 is a fragmentary sectional view which illustrates a simplified alternative embodiment wherein a hydrodynamic seal incorporates a non-planar flexible transitional heel geometry.

Figure 7:
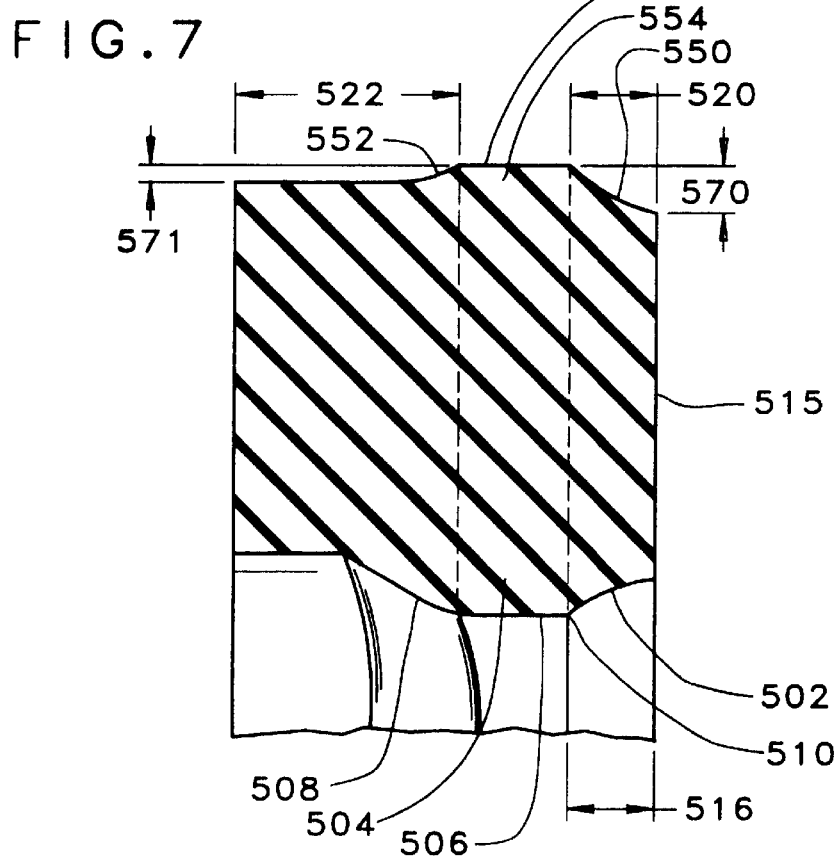

FIG. 7 is a fragmentary sectional view which illustrates the preferred embodiment wherein a hydrodynamic seal incorporates a non-planar flexible transitional heel geometry, a non-planar recess geometry, and a lubricant side recessed surface which defines a static sealing lip, with the seal having the same external geometric form as that of FIGS. 5 & 5A, but without dual seal sections defining the seal body.

Figure 8:
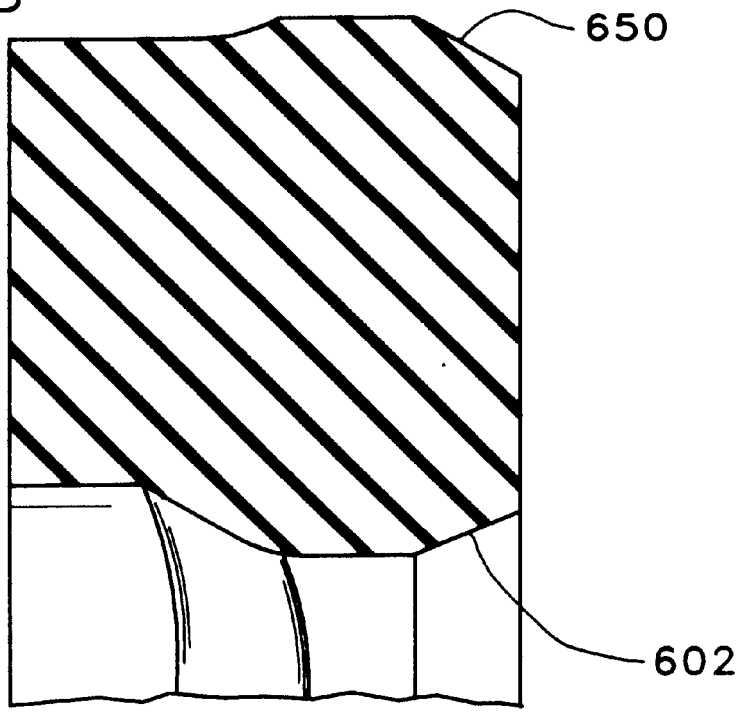

FIG. 8 is a fragmentary sectional view which illustrates an alternative embodiment wherein a hydrodynamic seal incorporates a non-planar flexible transitional heel geometry having conical form and a non-planar recess geometry having conical form.

Figure 9:
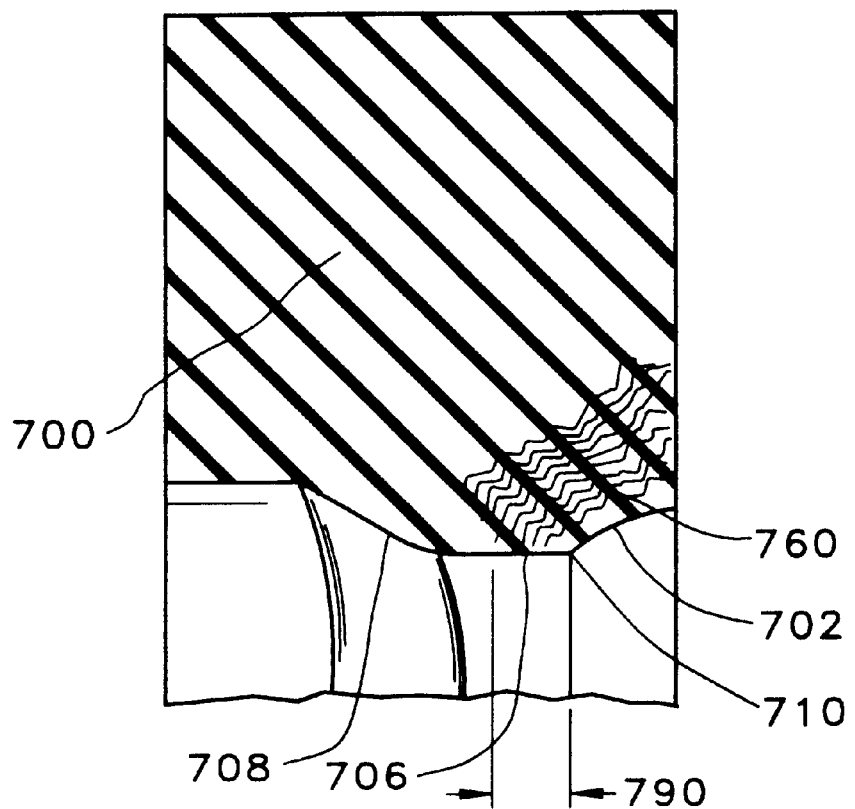

FIG. 9 is a fragmentary sectional view which illustrates an alternative embodiment wherein a hydrodynamic seal incorporates a non-planar flexible transitional heel geometry, and wherein said heel geometry is locally reinforced against extrusion by a higher modulus material.

Figure 10:
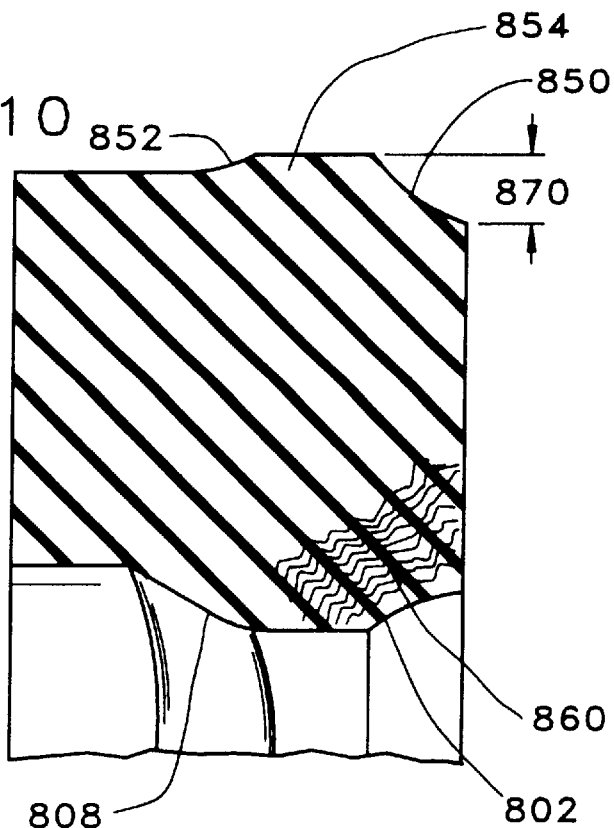

FIG. 10 is a fragmentary sectional view which illustrates an alternative embodiment wherein a hydrodynamic seal incorporates a non-planar flexible transitional heel geometry locally reinforced against extrusion by a higher modulus material, and incorporates a non-planar recess geometry, and a lubricant side recessed surface which defines a static sealing lip.

Figure 11:
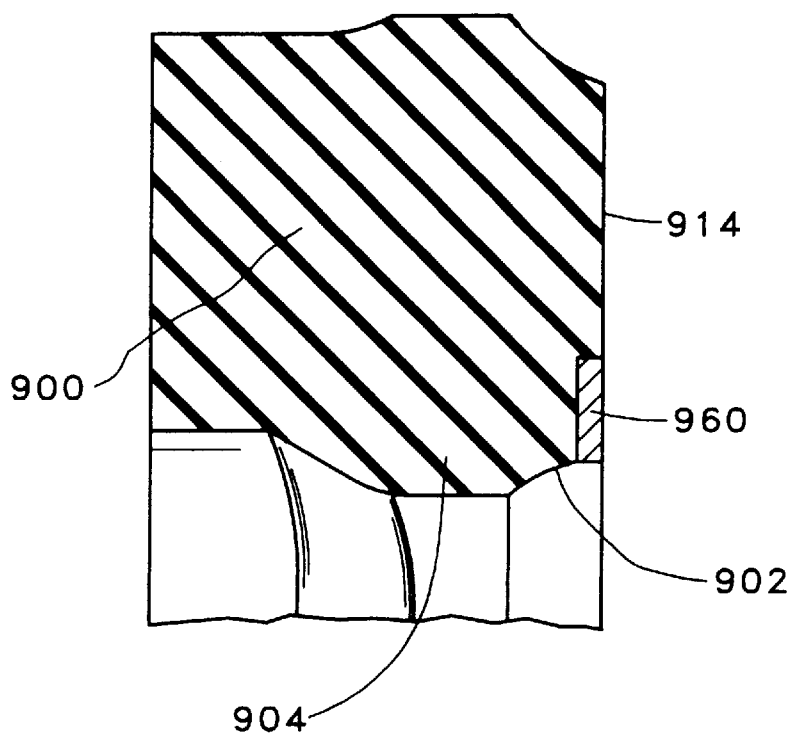

FIG. 11 is a fragmentary sectional view which illustrates an alternative embodiment wherein a hydrodynamic seal incorporates a non-planar flexible transitional heel geometry, and wherein said heel geometry is locally reinforced against extrusion by an integral ring of higher modulus material.

DETAILED DESCRIPTION OF PREFERRED EMBODIMENT

Referring now to the drawings, FIGS. 5 and 5A represent the preferred embodiment of the invention. FIG. 5 is a fragmentary cross-sectional view representing the uncompressed condition of the seal. FIG. 5A is a fragmentary view which represents the cross-sectional configuration of the seal when located within its seal groove and radially compressed between the rotary shaft and the radially outer wall of the seal groove under conditions where the lubricant pressure is higher than the environment pressure. Though the preferred embodiment shown in FIGS. 5 & 5A incorporates radially interconnected seal components 152 and 156, such is not intended to limit the present invention in any manner whatever. It is intended that the seal of the present invention may incorporate one or more seal components without departing from the spirit and scope of the invention.

In FIG. 5A there is shown a cross-sectional view of a sealed rotary shaft assembly including a housing 130 from which extends a rotary shaft 132. The housing defines an internal seal installation groove or gland 134 within which is located a ring shaped hydrodynamic rotary shaft sealing element 136 which is constructed in accordance with the principles of the present invention.

The hydrodynamic seal 136 is used to separate the lubricant 138 from the environment 140, and to prevent intermixing of the lubricant and the contaminant matter present within the environment. From an overall orientation standpoint, the first axial end of the circular sealing element 136 which is oriented toward the lubricant is defined by end surface 142 and the second axial end of the seal which is oriented toward the environment 140 is defined by surface 144, the inner diameter of the seal is represented at 146, and the outer diameter is represented at 148. The compressed configuration of the seal shown in FIG. 5A is representative of its shape and position within the gland when the pressure of the lubricant 138 is higher than that of the environment 140, and the pressure of the lubricant forces the environmental end 144 of the seal against the environment-side gland wall 150.

At the inner periphery of the circular sealing element 136 there is provided an inner circumferential protuberance or lip 156 that defines a dynamic sealing surface 146 that is compressed against a counter-surface 158 of the rotatable shaft 132. When the seal 136 is installed in the circular seal groove or gland 134, a circular radially protruding static sealing lip 152 is compressed against a counter-surface 154 of the groove per the teachings of U.S. Pat. No. 5,230,520 which is incorporated by reference herein. The static sealing lip approximates the average shape of the dynamic lip 156 by incorporation of non-planar lubricant side 182 and non-planar environmental side 184, but the projection 170 of the static sealing lip does not necessarily equal projection 172 of the dynamic lip. The circular seal groove or gland 134 is sized to hold the resilient circular sealing element 136 in radial compression against the cylindrical sealing surface 158 of the shaft 132, thereby initiating a static seal with the housing and shaft in the same manner as any conventional interference type seal, such as an O-Ring. When shaft rotation is not present, a liquid tight seal is maintained at the static sealing interface between the static sealing lip 152 and the mating counter-surface 154 of the seal groove, and between the dynamic sealing lip 156 and the counter-surface 158 of the shaft 132.

When shaft rotation takes place, the hydrodynamic seal remains stationary with respect to the housing, and maintains a static sealing interface with said housing, while the seal-to-shaft interface becomes a dynamic sealing interface. The inner lip 156 incorporates a special geometry that promotes long seal life by hydrodynamically lubricating the dynamic seal-to-shaft interfacial zone, and by excluding environmental contaminates from the seal to shaft interface; this special geometry consists of a wavy, axially varying edge 160 on the lubricant side of the lip and a circular, abrupt non-axially varying edge 162 on the environmental side of the lip per the teachings of U.S. Pat. No. 4,610,319 which is incorporated by reference herein. From an overall orientation standpoint, FIGS. 5 and 5A (like all cross-sectional figures herein) are taken at a circumferential location which represents the average interfacial contact width of the dynamic sealing interface, which corresponds to the midpoint in the wave height of the hydrodynamic lubrication geometry described in U.S. Pat. No. 4,610,319.

As relative rotation of the shaft takes place, the wavy, axially varying edge 160 on the lubricant side of the lip, which has a gradually converging relationship with the shaft, generates a hydrodynamic wedging action that introduces a lubricant film between the seal inner surface 146 and the counter-surface 158 of the shaft per the previously described teachings of U.S. Pat. No. 4,610,319. This lubricant film physically separates the seal and the shaft, and thereby prevents the typical dry rubbing type wear and blistering heat damage associated with conventional non-hydrodynamic interference type seals, and thereby prolongs seal and mating shaft surface life and makes higher service pressures and higher speeds practical. The hydrodynamic inlet geometry can take any one of many suitable forms that result in a gradually converging, axially varying shape at the lubricant side of the dynamic sealing lip without departing from the spirit or scope of the present invention.

The abrupt circular corner 162 of the environmental side of the dynamic sealing lip is not axially varying, and does not generate a hydrodynamic wedging action with the environment in response to relative rotary motion, and thereby functions to exclude particulate contaminants from the seal-to-shaft interface per the previously described teachings of U.S. Pat. No. 4,610,319.

The improved extrusion resistance of the present invention is accomplished by the cooperative benefits of a composite multiple modulus construction and a non-planar flexible environmental end transitional heel geometry. So that the portion of the dynamic sealing lip closest to the shaft to housing extrusion gap exhibits high extrusion resistance, a limited portion 164 of the seal which includes the dynamic sealing lip 156 and non-planar flexible transitional heel geometry 174, is constructed from a hard, relatively high modulus extrusion resistant material such as a flexible polymeric material, a high modulus elastomer such as one having 90 or 95 Durometer Shore A hardness, or a fabric, fiber and/or metal reinforced elastomer or a high performance temperature resistant plastic such as Teflon or Peek which is filled with glass, carbon or graphite fillers.

A hydrodynamic larger portion 164 of the seal which is integrally bonded to the limited portion is made from a relatively soft, resilient material such as a low durometer elastomer having 40–80 Durometer Shore A hardness. The interface 167 between 164 and 166 may take cylindrical form, as shown, or other suitable form. The interface 167 between 164 and 166 is bonded (such as during molding of the seal) to form a one piece integrally constructed sealing element of composite construction. The composite multiple modulus construction provides the extrusion resistance benefit of higher modulus materials without the usual accompanying penalty of high interfacial contact pressure. The contact pressure at the dynamic sealing interface resulting from radial compression is governed by the relatively low modulus of the relatively soft, resilient material 166 rather than by the relatively high modulus of the relatively hard, extrusion resistant material 166 used to construct the dynamic sealing lip thereby reducing breakout and running torque and self generated heat.

Since the dynamic sealing lip material 164 has a significantly higher modulus than the softer body material 166, the softer body material is compressed to a significantly higher percentage of compression than the harder material of the dynamic sealing lip upon installation, therefore radial compression has very little effect upon the shape of the dynamic sealing lip so that the angulated, positionally varying hydrodynamic inlet geometry 160 and the non-planar flexible transitional heel geometry 174 are not overly flattened against the relatively rotating counter-surface. Therefore the intended hydrodynamic wedging of lubricant into the dynamic sealing interface is not impeded by any undesirable gross distortion of the hydrodynamic geometry, nor is the function of flexible geometry 174 impeded by gross distortion. This is an improvement over the prior art, where the dynamic lip could in some cases become flattened and distorted when subject to radial compression because it compressed at the same rate as the static sealing lip. In the present invention, the optimum projection 170 of the static sealing lip is approximately equal in dimension to the amount of compression the softer body material 166 undergoes upon installation. The projection 172 of the dynamic sealing lip can be much less than that of the prior art owing to the high modulus construction of the dynamic lip of the present invention, which limits the amount of compression induced distortion of the dynamic lip, and also enhances the extrusion resistance of the dynamic lip. It can also be appreciated that the minimal distortion of the dynamic sealing lip material 164, as compared to the prior art, makes the present invention much more tolerant of high levels of installation squeeze. In the prior art seal the distortion of the dynamic lip due to radial compression also results in axial spreading of the seal footprint against the shaft, which increases the seal torque; in the present invention the axial width of the seal footprint is relatively constant over a wide range of seal compression, and seal torque is therefore less sensitive to radial compression variations.

The aforementioned non-planar flexible transitional heel geometry 174 extends from abrupt circular exclusionary corner 162 to corner 176 which is defined at the intersection with environmental end surface 144. Because of the circular, non-axially varying environmental edge configuration of abrupt edge 162, the seal does not generate a hydrodynamic wedging action with the environment in response to relative rotary motion, and thereby functions to exclude particulate contaminants from the seal-to-shaft interface per the teachings of U.S. Pat. No. 4,610,319. Compared to prior art, the exclusionary function of abrupt edge 162 is enhanced by the non-planar flexible transitional heel geometry 174 because the hydraulic force resulting from lubricant pressure acting over the unsupported seal area between the last point of contact with the shaft 178 and the last point of contact 180 with the environmental wall amplifies the interfacial contact pressure at the environmental edge of the seal footprint. The exclusionary function of abrupt edge 162 is further enhanced by the non-planar flexible transitional heel geometry 174 because the overhanging seal body material located to the right of abrupt edge 162 (radially outward from heel geometry 174) experiences radial compression which is reacted by the dynamic lip, thereby increasing interfacial contact pressure at the environmental edge of the seal footprint, compared to the prior art.

The non-planar flexible transitional heel geometry 174 provides the seal with significant pressure retention advantages over the prior art, as described hereafter. The modulus of the material used in construction of prior art high pressure seals was limited to relatively low values which upon radial compression did not cause excessive interfacial contact pressure, therefore the environmental end of the seal was necessarily given a planar shape so that the relatively soft seal material was supported by the planar shape of the gland wall against lubricant pressure. This meant that high lubricant pressure could make the material adjacent to the extrusion gap bulge into the extrusion gap and receive fatigue damage. With the present invention, wherein the dynamic lip 156 is constructed of a hard, stiff, high modulus flexible material, the axial force imposed by lubricant pressure causes transitional non-planar flexible transitional heel geometry 174 to flex toward the shaft to housing extrusion gap, but does not force it to extrude or bulge into the extrusion gap. The environmental side of the seal is therefore protected from fatigue resulting from contact with the potentially sharp, rough corner 176, and is protected from fatigue damage which can result from being repeatedly forced to into the extrusion gap past sharp corner 176.

With the prior art seal, any material forced to extrude or bulge into the extrusion gap is subjected to a high level of stress as the extrusion gap size changes due to pressure breathing of the housing and dynamic lateral shaft motion, because the extrusion gap size change is very large compared to the size of the extruded material. For example, the local extrusion gap can vary dynamically due to shaft runout. The worst extrusion of seal material is caused when the local extrusion gap is temporarily at its largest, then the local extrusion gap may quickly close to near zero clearance as the high point of shaft runout passes by. The high level of resulting stress causes fatigue of the extruded material, causing it to break off from the seal, as described earlier. When the present invention is exposed to high lubricant pressure, as shown in FIG. 5A, the non-planar flexible transitional heel geometry drapes between the last point of contact 178 with the shaft 132 and the last point of contact 180 with the environmental side gland wall 150. As the extrusion gap size changes, the non-planar flexible transitional heel geometry absorbs the lateral movement over the distance between 178 and 180, which is a relatively long distance (compared to the prior art extrusion gap size) so the average strain is kept below the fatigue limit of the seal material. This feature provides the seal with the ability to withstand higher pressure, larger shaft to housing clearance, and larger lateral motion compared to the prior art.

DESCRIPTION OF ALTERNATIVE EMBODIMENTS

FIG. 6 illustrates a simplified alternative embodiment of the invention wherein a basic ring shaped resilient seal body 300 of single modulus construction incorporates a non-planar flexible transitional heel geometry 302 for added extrusion resistance. As with the preferred embodiment, the seal of FIG. 6 has been engineered such that it's geometry, interfacial contact pressure, and response to relative rotary motion combine to generate a hydrodynamic lubricant film which separates the seal from the mating relatively rotating counter-surface. The thickness of the film is proportional to the interfacial contact pressure and also dependent on other factors, such as the installed shape of the hydrodynamic geometry and the viscosity of the lubricant film.

The alternative embodiment of FIG. 6 is a circular interference type hydrodynamic rotary seal for location within a housing defining a lubricant chamber, and for dynamic sealing engagement with a relatively rotatable surface, and for serving as a partition between the lubricant chamber and an environment, and for controlling seal deformation and for controlling interfacial contact force between the seal and the relatively rotatable surface. The seal incorporates a circular dynamic sealing lip 304 projecting from ring shaped seal body 300 and having a peripheral sealing surface 306 for dynamic sealing engagement with the relatively rotatable surface, said dynamic sealing lip further defining a hydrodynamic geometry 308 at one axial end, and an abrupt axially non-varying circular exclusionary geometry 310 at the opposite axial end. The hydrodynamic geometry 308 has an positionally varying configuration facing the lubricant chamber for pumping a film of lubricant between said dynamic sealing lip and said relatively rotatable surface, thereby lubricating peripheral sealing surface 306. The rotary seal also incorporates a non-lubricated static sealing peripheral sealing surface 355 for static sealing engagement with the housing. The general configuration of a typical housing and relatively rotatable surface has been described in detail previously in conjunction with FIGS. 2, 2A, 5, and 5A, and the principle of hydrodynamic lubrication has been described in conjunction with FIG. 3.

While the simplified alternative embodiment of FIG. 6 does not attain all of the benefits of the preferred multiple modulus embodiment of FIGS. 5 & 5A, testing conducted by the inventors and their associates has demonstrated that the non-planar flexible transitional heel geometry 302 does provide significantly increased extrusion resistance compared to all prior art single modulus hydrodynamic seals. The tooling and manufacturing costs of the FIG. 6 embodiment are also substantially less than that of the FIGS. 5 & 5A embodiment, which is an important advantage in cost sensitive applications.

The seal body 300 defines a first circular axial end surface 301 which defines the lubricant end of the seal and a second circular axial end surface 314 which is oriented in substantially normal relation with peripheral sealing surface 306, and which defines the environment end of the hydrodynamic seal. A circular non-planar flexible transitional heel geometry 302 is defined by the dynamic lip 304 and extends from abrupt axially non-varying circular exclusionary geometry 310 to a circular corner 312 which is defined at the intersection of the non-planar flexible transitional heel geometry with environmental end surface 314. The non-planar flexible transitional heel geometry 302 has circular intersection with environmental end surface 314 radially remote from peripheral sealing surface 306, and has circular intersection with peripheral sealing surface 306 of dynamic sealing lip 304 axially remote from end surface 314. Because of the circular, non-axially varying environmental edge configuration of exclusionary geometry 310, the seal does not generate a hydrodynamic wedging action with the environment in response to relative rotary motion, and thereby functions to exclude particulate contaminants from the seal-to-shaft interface as described previously. The exclusionary character of the circular, non-axially varying environmental edge is enhanced by contaminant scraping activity which occurs upon dynamic axial shaft motion. Compared to prior art, the exclusionary function of abrupt axially non-varying circular exclusionary geometry 310 is enhanced by the non-planar flexible transitional heel geometry 302 because the hydraulic force resulting from lubricant pressure acting over the unsupported area between the last point of contact at 310 with the relatively rotatable surface and the last point of contact at corner 312 with the environmental wall amplifies the interfacial contact pressure at the environmental edge of the seal footprint of the peripheral sealing surface against the relatively rotatable surface. The exclusionary function of abrupt axially non-varying circular exclusionary geometry 310 is further enhanced by the non-planar flexible transitional heel geometry 302 because the overhanging seal body material 320 located in FIG. 6 to the right of abrupt axially non-varying circular exclusionary geometry 310 and radially outward from non-planar flexible transitional heel geometry 302 experiences radial compression which is reacted by the dynamic lip, thereby increasing interfacial contact pressure at the environmental edge of the seal footprint, compared to the prior art. The interfacial contact pressure adjacent to the exclusionary geometry 310, and the pressure induced distortion of non-planar flexible transitional heel geometry 302, can be regulated by controlling the length 316 and depth 318 of the non-planar flexible transitional heel geometry 302.

The non-planar flexible transitional heel geometry 302 provides the seal with significant pressure retention advantages over conventional hydrodynamic seals because the axial force imposed by lubricant pressure causes transitional non-planar flexible transitional heel geometry 302 to flex toward the shaft to housing extrusion gap, but does not force it to extrude or bulge into the extrusion gap. The seal is therefore protected from fatigue damage which can in prior art seals result from being repeatedly forced past the sharp, potentially rough gland corner and into the extrusion gap between the housing and the relatively rotatable surface. With a conventional seal, any material forced to extrude or bulge into the extrusion gap is subjected to a high level of stress as the extrusion gap size changes due to pressure breathing of the housing and dynamic lateral shaft motion, because the extrusion gap size change is very large compared to the size of the extruded material. For example, the local extrusion gap can vary dynamically due to shaft runout. The worst extrusion of seal material is caused when the local extrusion gap is temporarily at its largest, then the local extrusion gap may quickly close to near zero clearance as the high point of shaft runout passes by. The high level of resulting stress causes fatigue of the extruded material, causing it to break off from the seal, as described earlier. When the present invention is exposed to high lubricant pressure, the non-planar flexible transitional heel geometry drapes between the last point of contact with the relatively rotatable surface at abrupt axially non-varying circular exclusionary geometry 310 and the last point of contact with the environmental side gland wall at corner 312. As the extrusion gap size changes, the non-planar flexible transitional heel geometry absorbs the lateral movement over the distance between 310 and 312, which is a relatively long distance (compared to the extrusion gap size) so the average strain is kept below the fatigue limit of the seal material. The improved extrusion resistance allows the seal to tolerate higher service pressure compared to conventional hydrodynamic seals.

The non-planar flexible transitional heel geometry also provides means which improve long term hydrodynamic lubrication by counteracting several film degradation actions, as follows. In prior art seals, the propagation of extrusion damage across the peripheral sealing surface physically disrupts the hydrodynamic lubricant film. The resulting frictional heat further disrupts the film by reducing lubricant viscosity and by promoting heat embrittlement and film disruptive cracking of the peripheral sealing surface, and further reduces extrusion resistance by lowering the overall modulus of elasticity of the seal. Because of the improved extrusion resistance of the present invention, extrusion damage propagation and embrittlement induced crack propagation across the peripheral sealing surface is minimized, providing for adequate film thickness to be maintained so that running temperature is moderated, which also moderates temperature related modulus of elasticity loss. The added extrusion resistance of the seal therefore provides means for controlling and maintaining the thickness of the film of lubricant between the peripheral sealing surface and the relatively rotatable counter-surface.

In prior art seals, the loss of material due to extrusion damage can also cause the hydrodynamic geometry to become distorted as pressure driven extrusion feeds portions of the dynamic lip through the extrusion gap. This volume-loss distortion effect, if severe, can negatively affect the film thickness and cause the seal to run hotter. The improved extrusion resistance of the present invention minimizes extrusion related distortion of the hydrodynamic geometry, therefore the film thickness is better maintained, permitting the seal to run cooler over the long term. When extrusion damage is sustained in the prior art seal, the high frequency of compression, flexing and tearing of the extruded material also generates substantial heat which negatively affects film thickness and modulus of elasticity; the improved extrusion resistance of the present invention minimizes this effect. The seal therefore provides means for controlling and maintaining hydrodynamic wedging of the film of lubricant and controlling the thickness of the film of lubricant between the peripheral sealing surface and the relatively rotatable surface by virtue of minimizing extrusion damage and by minimizing distortion of the hydrodynamic geometry.

When prior art hydrodynamic seals are used in unpressurized applications, the environment end (surface 9 on FIGS. 2 & 2A) becomes convex as a function of the radial compression of the seal because the seal compression is concentrated near the environment end of the seal. Finite element analysis shows that the convex distortion of the prior art seal reduces interfacial contact pressure at the dynamic sealing surface (surface 13 on FIGS. 2 & 2A) near the abrupt axially non-varying circular exclusionary geometry (16 on FIGS. 2 & 2A) compared to pressurized seals, which reduces the performance of the contaminant exclusion function of the abrupt axially non-varying circular exclusionary geometry 16. In the present invention of FIG. 6, the axial length 316 of the non-planar flexible transitional heel geometry 302, by defining overhanging seal body material 320, provides the seal with more nearly symmetric compression which minimizes the distortion of the environment end 314 of the seal and minimizes any resulting tendency of the seal to twist or roll within the gland, maintains more uniform interfacial contact pressure at the dynamic sealing surface 306, and thereby improves the contaminant exclusion function of the abrupt axially non-varying circular exclusionary geometry 310 compared to prior art. The increased interfacial contact pressure near the abrupt axially non-varying circular exclusionary geometry 310 also tends to minimize lubricant leakage from the lubricant chamber past exclusionary geometry 310. This leakage control function is important in many applications, such as in subsurface applications with limited lubricant supply.

In the preferred embodiment (FIGS. 5 & 5A & 7), the pressure induced distortion of the non-planar flexible transitional heel geometry is minimized by constructing the dynamic sealing lip from a higher modulus of elasticity material, which is not the case in a single modulus seal. As a result, the length 316 and depth 318 of the non-planar flexible transitional heel geometry 302 of the alternative embodiment of FIG. 6 must be kept relatively small so that the unsupported area over which the pressure can act is minimized. The radial dimension 318 of the non-planar flexible transitional heel geometry 302 should be less than $\frac{1}{16}$ inch and is preferably 0.03 inch or less, and the axial dimension 316 should be less than 0.04 inch and is preferably 0.03 inch or less to minimize the unsupported area over which the lubricant pressure can act, thereby minimizing pressure induced distortion of the non-planar flexible transitional heel geometry. By keeping the radial dimension 318 and the axial dimension 316 relatively small, the geometry of non-planar flexible transitional heel geometry 302 is kept in a range which is compatible with a seal material modulus of elasticity which is suitable for single modulus seals from an interfacial contact pressure standpoint; i.e. a material modulus of elasticity compatible with high pressure extrusion resistance can be employed while maintaining the interfacial contact pressure within a useful range for hydrodynamic lubrication. For the single modulus seal body construction of FIG. 6, to obtain useful high pressure extrusion resistance combined with a useful range of interfacial contact pressure, the nominal material hardness should optimally be in the range of 85–90 durometer Shore A.

Referring now to FIG. 7, a preferred embodiment of the present invention is geometrically in the form of the embodiment shown in FIGS. 5 & 5A, with exception of the dual integral sections which define the seal body. One artifact of the embodiment of FIG. 6 is the tendency for the radial compression of the overhanging seal body material 320 (located to the right of abrupt axially non-varying circular exclusionary geometry 310 and radially outward from non-planar flexible transitional heel geometry 302) to displace the non-planar flexible transitional heel geometry 302 toward the relatively rotatable surface, diminishing it's extrusion resistance functionality. The preferred embodiment of FIG. 7 also overcomes this problem by providing a non-planar recess geometry 550 at the environment end of static sealing surface 555 which is in opposed relation to non-planar flexible transitional heel geometry 502. Because of non-planar recess geometry 550, the compression of the overhanging seal body material 520 is reduced (compared to the embodiment of FIG. 6), and therefore the compression induced flattening of the non-planar flexible transitional heel geometry 502 is minimized, and the local interfacial contact pressure near abrupt axially non-varying circular exclusionary geometry 510 resulting from compression of overhanging material 520 can be better regulated, thereby regulating local film thickness and regulating net lubricant leakage past exclusion geometry 510. The non-planar recess geometry 550 also provides increased extrusion resistance for the static sealing periphery 555 in those cases where, as a result of a removable gland wall, an extrusion gap exists near non-planar recess geometry 550. The basis of the improved extrusion resistance of non-planar recess geometry 550 is the same as the basis described above for the increased extrusion resistance of the non-planar flexible transitional heel geometry.

Common resilient materials used to produce interference type hydrodynamic seals, such as elastomers, have a coefficient of thermal expansion which is typically at least an order of magnitude higher than the usual metallic materials used to construct the housing gland which contains and positions the seal. As a result, the fit between the seal and the gland varies as a function of temperature. Compression variations can also affect the fit. The hydrodynamic rotary seal is often used in an elevated temperature environment, and also generates it's own heat due to lubricant shear and inadvertent asperity contact in the dynamic sealing interface. The seal experiences volumetric thermal expansion (which is about triple the linear coefficient of thermal expansion), but is confined radially and circumferentially, so most of the thermal expansion is relieved axially, which contributes significantly to variations in the installed axial length of the seal. The seal material may also experience substantial swelling from exposure to, and absorption of, liquids to which the seal is exposed.

All of the above mentioned factors can make it difficult to accurately predict the installed volume and width of the seal for gland sizing purposes. If thermal expansion and/or swelling causes the seal to overfill it's gland, the interfacial contact pressure between the dynamic sealing lip and the mating relatively rotatable surface will increase dramatically, which can damage the dynamic sealing lip due to impairment of the hydrodynamic film, and due to the resulting wear and increased local temperature. Incipient over-filling of the gland can also severely flatten and impair the function of the hydrodynamic geometry, negatively affecting film thickness. The pressure resulting from over-filling of the gland can also cause extensive extrusion damage to the seal, leading to complete failure.

The non-planar recess geometry 550 reduces overall seal volume without changing the initial overall axial and radial dimensions of the seal, and thus delays the potential onset of over-filling of the gland by the seal without effecting the initial axial and radial fit with the gland (which is important from an abrasion resistance standpoint as discussed in detail in U.S. application Ser. No. 08/495,272). The depth 570 of non-planar recess geometry 550 can also be dimensioned such that non-planar recess geometry 550 is not completely flattened by initial compression, thereby providing void volume within the gland for thermal expansion and swelling of the seal, thus further delaying the potential onset of over-filling of the gland by the seal. Thus the non-planar recess geometry 550 provides means to accommodate thermal expansion and swelling, thereby providing means to assure adequate hydrodynamic lubrication and extrusion resistance in severe operating conditions.

Referring now to FIG. 6, the depth 318 of non-planar flexible transitional heel geometry 302 is always dimensioned such that non-planar flexible transitional heel geometry 302 is not completely flattened by initial compression, thereby providing void volume within the gland for thermal expansion and swelling of the seal, thus further delaying the potential onset of over-filling of the gland by the seal. Thus the non-planar flexible transitional heel geometry 302 provides means to accommodate thermal expansion and swelling, thereby providing means to assure adequate hydrodynamic lubrication and extrusion resistance in severe operating conditions. Likewise the non-planar flexible transitional heel geometry 502 of FIG. 7 also reduces overall seal volume without changing the initial overall axial and radial dimensions of the seal, and thus delays the potential onset of over-filling of the gland by the seal without effecting the initial axial and radial fit with the gland.

Another artifact of the embodiment of FIG. 6 is the tendency for the radial compression of the overhanging seal body material 322 located to the left of hydrodynamic geometry 308 to distort and flatten the hydrodynamic geometry 308 against the shaft and negatively affect hydrodynamic film thickness, thus limiting total practical compression. The compression of the overhanging seal body material 322 tends to twist the seal cross-section counterclockwise, and causes increased interfacial contact pressure between the dynamic seal lip and relatively rotatable surface at the lubricant edge of the peripheral sealing surface, which degrades the hydrodynamic pumping action. The counter-clockwise twisting also reduces interfacial contact pressure at exclusionary geometry 310, reducing its exclusionary performance. The preferred embodiment of FIG. 7 overcomes these problems by providing a lubricant side recessed surface 552 which is in opposed relation to hydrodynamic geometry 508 and on the lubricant side of static sealing surface 555, and which defines a static sealing lip 554 which is in opposed relation to dynamic sealing lip 504. Because of opposed lubricant side recessed surface 552, the compression of the overhanging seal body material 522 is reduced, and therefore the flattening of hydrodynamic geometry 508 is minimized. Therefore the intended hydrodynamic pumping of lubricant is not impeded by any undesirable gross distortion of the hydrodynamic geometry. This makes higher levels of initial compression possible without compromising the film generating function of the hydrodynamic geometry 508. Because of the reduced compression of the overhanging seal body material 522, the interfacial contact pressure between the dynamic sealing lip and the relatively rotatable surface is reduced overall, and especially at the lubricant edge of the peripheral sealing surface. This promotes a stronger hydrodynamic pumping action and results in a thicker film and better lubrication of the peripheral sealing surface.

The static sealing lip 554 defined by lubricant side recessed surface 552 has approximately the same axial location as the dynamic sealing lip 304, and the static sealing surface 555 has approximately the same axial length as the peripheral sealing surface 506. Because both lips have the same general axial location and length, when the rotary seal is compressed, the interfacial contact force profiles and deformation of the two lips are similar in both their magnitude and axial location, and as a result, there is no gross tendency for the seal to twist counter-clockwise within the gland in the absence of lubricant pressure. This improves the exclusionary performance of exclusionary geometry 310 by helping to maintain sufficient interfacial contact pressure at 310.

The lubricant side recessed surface 552 also reduces overall seal volume without changing the initial overall axial and radial dimensions of the seal, and thus delays the potential onset of over-filling of the gland by the seal without effecting the initial axial and radial fit with the gland. The depth 571 of lubricant side recessed surface 552 can also be dimensioned such that, unlike the prior art, the lubricant side recessed surface 552 is not completely flattened against the gland by initial compression, thereby providing substantial void volume within the gland for thermal expansion and swelling of the seal, thus significantly delaying the potential onset of over-filling of the gland by the seal. For example, to provide ample room for thermal expansion and swelling, the depth 571 of lubricant side recessed surface 552 can be equal to or greater than the projection of dynamic lip 504.Thus the lubricant side recessed surface 552 provides means to accommodate thermal expansion and swelling, thereby providing means to assure adequate hydrodynamic lubrication and extrusion resistance in severe operating conditions which can provoke incipient over-filling of the gland.

As will be readily apparent to those skilled in the art, the geometry of the non-planar flexible transitional heel geometry 502, and the geometry of the opposing non-planar recess geometry 550, the hydrodynamic geometry 508, and the opposed lubricant side recessed surface 552 can take many specific forms without departing from the spirit or scope of the present invention. For example, as shown in FIG. 7 the non-planar flexible transitional heel geometry 502 and the opposing non-planar recess geometry 550 can take the form of a circular recess having generally concave shape, and as shown in FIG. 8 the non-planar flexible transitional heel geometry 602 and the opposing non-planar recess geometry 650 can take the form of a circular recess surface being of conical configuration.

As will be readily apparent to those skilled in the art, the lubricant side recessed surface 552 and the non-planar recess geometry 550 can be used together as shown in FIGS. 5, 5A, 7 and 8 for maximum benefit, or can be used independently of one another if desired.

As shown in FIG. 9, the present invention may also incorporate means to locally stiffen and reinforce the non-planar flexible transitional heel geometry 702 against extrusion to restrain high pressure displacement of the non-planar flexible transitional heel geometry 702 toward the circular clearance between the housing and the relatively rotatable surface.

The reinforcing means may take the form of integral reinforcing material 760 which has a higher modulus of elasticity than the predetermined modulus of elasticity of the basic seal body 700, and which is embedded within the seal and concentrated in or near the region of the non-planar flexible transitional heel geometry 702. The integral reinforcing material 760 may be of any suitable type, such as fiber or fabric reinforcement material, or such as randomly oriented fibers constructed of a high strength reinforcement material such as the para-aramid fiber products sold under the registered trademark KEVLAR®. As shown in FIG. 9, the lay of the integral reinforcing material 760 can be oriented to provide heel flexibility in the radial direction while imparting stiffness in the axial direction.

This construction provides added extrusion resistance in the region of the non-planar flexible transitional heel geometry 702 where strength and stiffness is needed to limit and minimize lubricant pressure induced deformation of the non-planar flexible transitional heel geometry, while leaving the hydrodynamic inlet geometry 708 relatively flexible and thereby minimizing interfacial contact pressure at the hydrodynamic inlet geometry and thereby promoting sufficient hydrodynamic lubrication of the dynamic peripheral sealing surface 706.

The composite multiple modulus seal construction of FIG. 9 provides the extrusion resistance benefit of the higher modulus integral reinforcing material 760 without the usual accompanying penalty of high interfacial contact pressure that would occur if the entire rotary seal were constructed from the higher modulus integral reinforcing material 760. The contact pressure at the dynamic sealing interface resulting from radial compression is governed by the predetermined modulus of elasticity of the basic seal body 700 rather than by the higher modulus of the relatively hard, extrusion resistant integral reinforcing material 760, thereby establishing interfacial contact pressure in a range compatible with adequate film thickness, and minimizing breakout and running torque and self generated heat. The seal therefore provides means, comprising the lower modulus of elasticity of the predetermined modulus of elasticity of the seal body 700 compared to that of the integral reinforcing material 760, for minimizing contact force of the peripheral sealing surface 706 of the dynamic sealing lip with the relatively rotatable surface for controlling hydrodynamic wedging of the film of lubricant and controlling the thickness of the film of lubricant between the peripheral sealing surface and the relatively rotatable surface.

As shown in FIG. 10, a hydrodynamic rotary seal which incorporates a non-planar flexible transitional heel geometry 802 which is reinforced and stiffened locally against extrusion by integral reinforcing means 860 can also incorporate an opposed non-planar recess geometry 850 in opposed relation to the non-planar flexible transitional heel geometry 802 to provide the recess geometry benefits described above in conjunction with FIG. 7. The radial dimension 870 of the non-planar recess geometry 850 should be relatively large to compensate for the stiffness of the reinforcing material 860. As shown in FIG. 10, such a seal can also incorporate a lubricant side recessed surface 852 which is implemented in opposed relation to hydrodynamic geometry 808, and which defines a projecting static sealing lip 854 for the purposes described above.

The reinforcing material 760 may also extend past abrupt axially non-varying circular exclusionary geometry 710 by some distance 790 as shown in FIG. 9 to locally stiffen peripheral sealing surface 706 if desired. In typical hydrodynamic seals, the lubricant film is thicker near the hydrodynamic geometry (15 on FIGS. 2 & 2A) owing to the close proximity to the hydrodynamic pumping action, and thinner near the abrupt axially non-varying circular exclusionary geometry (16 on FIGS. 2 & 2A) due to the remoteness from the pumping action and the draping ability of the seal material. By locally stiffening peripheral sealing surface 706, the draping ability of the peripheral sealing surface is diminished, and it tends to be "propped up" across much of it's axial length by the thick film existing near the hydrodynamic inlet geometry 708, thereby achieving an effective increase in film thickness near abrupt axially non-varying circular exclusionary geometry 710.

Referring again to FIG. 6, lubricant pressure acting over the unsupported area between the last point of contact 310 with the relatively rotatable shaft surface and the last point of contact 312 with the environment-side gland wall causes deformation of the non-planar flexible transitional heel geometry 302, causing it to bulge toward the extrusion gap by causing the last point of contact with the shaft to move towards the environmental side gland wall, and by causing the last point of contact with the environmental side gland wall to move toward the relatively rotatable surface. The ultimate pressure capability of the seal depicted by FIG. 6 is limited by such pressure induced deformation of the non-planar flexible transitional heel geometry; at some elevated level of pressure well beyond the capacity of the prior art, extrusion will occur. The previously described alternative embodiments of FIGS. 9 and 10 minimize pressure induced deformation of the non-planar flexible transitional heel geometry by employing fiber, fabric, or metal particles to reinforce a local portion of the seal near the non-planar flexible transitional heel geometry. FIG. 11 shows an alternative means of reinforcing the non-planar flexible transitional heel geometry with a higher modulus integral reinforcing material. The rotary seal incorporates a dynamic sealing lip 904 and a non-planar flexible transitional heel geometry 902. A continuous ring 960 of very high modulus of elasticity material (such as high strength plastic or metal) is incorporated as an integral part of the environment end 914 of the rotary seal body by virtue of being bonded during the molding process to the resilient material of the body 900 of the seal. The continuous ring 960 should be sized so that it does not contact the relatively rotatable surface of the shaft. By virtue of the bonded relationship, the end of the non-planar flexible transitional heel geometry oriented toward the environment is reinforced against pressure-induced movement radially inward toward the relatively rotatable surface (not-shown), and the ultimate pressure retaining capacity of the seal is thereby significantly enhanced. By virtue of the bond between the continuous ring 960 and the seal body 900, the resilient material of the seal body is restrained by the bond from extruding past ring 960 and into the extrusion gap between the housing and the relatively rotatable surface.

As will be apparent to those skilled in the art, the present invention may be produced in other specific forms without departing from its spirit or essential characteristics. The present embodiments are therefore to be considered as illustrative and not restrictive.

This invention has application where rotary shafts are sealed with respect to a housing with either the housing or the shaft being the rotary member. The projecting dynamic and static sealing lips can be on the inside and outside of the seal cross-sectional shape when the seal is compressed in the radial direction, with the dynamic lip being located on either the inner or the outer periphery. Alternately, the projecting dynamic and static sealing lips can be on opposite ends of the seal cross-sectional shape when the seal is compressed in an axial direction against relatively rotating planar counter-surfaces.

What is claimed is:

1. A circular interference type extrusion resistant hydrodynamic seal for location within a circular seal gland of a housing defining a lubricant chamber for dynamic sealing engagement with a relatively rotatable surface and defining a circular clearance with the relatively rotatable surface, and serving as a partition between the lubricant chamber and a contaminated environment and for controlling seal deformation and interfacial contact force between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant end at one axial end thereof for exposure to the lubricant chamber and a contaminant end at the opposite axial end thereof for exposure to the contaminated environment;

(b) a circular dynamic sealing lip being defined by said seal body and projecting therefrom, said circular dynamic sealing lip having a peripheral sealing surface for sealing engagement with the relatively rotatable surface, said circular dynamic sealing lip defining a hydrodynamic geometry at one axial extremity thereof having an axially varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite axial extremity of said dynamic sealing lip for facing the contaminated environment;

(c) a circular non-lubricated peripheral static sealing surface being defined by said circular ring-like body for static sealing engagement with said housing; and (d) a non-planar flexible transitional heel geometry being defined by said circular dynamic sealing lip having circular intersection with said circular end surface radially remote from said peripheral sealing surface and having circular intersection with said peripheral sealing surface axially remote from said circular end surface.

2. The circular interference type extrusion resistant hydrodynamic seal of claim 1, wherein:
    said non-planar flexible transitional heel geometry being of generally concave configuration.

3. The circular interference type extrusion resistant hydrodynamic seal of claim 1, wherein:
    said non-planar flexible transitional heel geometry being of generally conical configuration.

4. The circular interference type extrusion resistant hydrodynamic seal of claim 1, comprising:
    means reinforcing said circular ring-like seal body adjacent said non-planar flexible transitional heel geometry to restrain high pressure displacement of said non-planar flexible transitional heel geometry.

5. The circular interference type extrusion resistant hydrodynamic seal of claim 4, wherein said means reinforcing said circular ring-like seal body being embedded within said resilient material and being located adjacent said non-planar flexible transitional heel geometry.

6. The circular interference type extrusion resistant hydrodynamic seal of claim 5, wherein said means reinforcing said circular ring-like seal body comprising:
    a quantity of fibrous reinforcing material being embedded within said circular ring-like seal body and being concentrated in the circular region thereof adjacent said non-planar flexible transitional heel geometry of said circular ring-like seal body.

7. The circular interference type extrusion resistant hydrodynamic seal of claim 5, wherein said means reinforcing said circular ring-like seal body comprising:
    a quantity of reinforcing fabric being embedded within said circular ring-like seal body and being concentrated in the region adjacent said non-planar flexible transitional heel geometry.

8. The circular interference type extrusion resistant hydrodynamic seal of claim 5, wherein said means reinforcing said circular ring-like seal body comprising:
    reinforcing material being embedded within said circular ring-like seal body and stiffening said peripheral sealing surface to minimize draping tendency thereof and enhancing lubricant film thickness at said peripheral sealing surface near said abrupt axially non varying exclusionary geometry of said circular dynamic sealing lip.

9. The circular interference type extrusion resistant hydrodynamic seal of claim 4, wherein:
    a lubricant side recessed surface being in opposed relation to said hydrodynamic geometry and defining a static sealing lip being of less axial length than the axial length of said circular ring-like seal body and projecting from said seal body and being located in substantially opposed relation with said dynamic sealing lip.

10. The circular interference type extrusion resistant hydrodynamic seal of claim 4, wherein:
    a non-planar recess geometry being defined by said circular ring-like seal body and being located in radially opposed relation with said non-planar flexible transitional heel geometry for regulating interfacial contact pressure of said dynamic sealing lip with the relatively rotatable surface in the region of said abrupt axially non varying exclusionary geometry and for regulating lubricant film thickness and net lubricant leakage, and for regulating deformation of said non-planar flexible transitional heel geometry, and for reducing volume of said circular ring-like seal body.

11. The circular interference type extrusion resistant hydrodynamic seal of claim 4, wherein said means reinforcing said circular ring-like seal body comprises:

a continuous ring of material being located at one axial extremity of said circular ring-like seal body and having a greater modulus of elasticity as compared to the modulus of elasticity of said circular ring-like seal body, said continuous ring of material being configured to reinforce said non-planar flexible transitional heel geometry and restrain pressure induced movement thereof.

12. The circular interference type extrusion resistant hydrodynamic seal of claim 1, comprising:

a non-planar recess geometry being defined by said circular ring-like seal body and being located in radially opposed relation with said non-planar flexible transitional heel geometry for regulating interfacial contact pressure of said dynamic sealing lip with the relatively rotatable surface in the region of said abrupt axially non varying exclusionary geometry and for regulating lubricant film thickness and net lubricant leakage and for regulating deformation of said non-planar flexible transitional heel geometry, and for reducing volume of said circular ring-like seal body.

13. The circular interference type extrusion resistant hydrodynamic seal of claim 12, wherein:

said non-planar recess geometry being of generally concave configuration.

14. A circular interference type extrusion resistant hydrodynamic seal for location within a circular seal gland of a housing defining a lubricant chamber for dynamic sealing engagement with a relatively rotatable surface and defining a circular clearance with the relatively rotatable surface, and serving as a partition between the lubricant chamber and a contaminated environment and for controlling seal deformation and interfacial contact force between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant end at one axial end thereof for exposure to the lubricant chamber and a contaminant end at the opposite axial end thereof for exposure to the contaminated environment;

(b) a circular dynamic sealing lip being defined by said seal body and projecting therefrom, said circular dynamic sealing lip having a peripheral sealing surface for sealing engagement with the relatively rotatable surface, said circular dynamic sealing lip defining a hydrodynamic geometry at one axial extremity thereof having an axially varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite axial extremity of said dynamic sealing lip for facing the contaminated environment;

(c) a circular non-lubricated peripheral static sealing surface being defined by said circular ring-like body for static sealing engagement with said housing; and (d) a non-planar flexible transitional heel geometry being defined by said circular dynamic sealing lip having circular intersection with said circular end surface radially remote from said peripheral sealing surface and having circular intersection with said peripheral sealing surface axially remote from said circular end surface, the radial (e) dimension of the non-planar flexible transitional heel geometry being less than ¹⁄₁₆ inch and the axial dimension of the non-planar flexible transitional heel geometry being less than 0.04 inch to minimize the unsupported area over which the lubricant pressure can act, thereby minimizing pressure induced distortion of the non-planar flexible transitional heel geometry, and maintaining the interfacial contact pressure within a useful range for hydrodynamic lubrication.

15. A circular interference type extrusion resistant hydrodynamic seal for location within a circular seal gland of a housing defining a lubricant chamber for dynamic sealing engagement with a relatively rotatable surface and defining a circular clearance of the housing with the relatively rotatable surface, and serving as a partition between the lubricant chamber and a contaminated environment and for controlling seal deformation and interfacial contact force between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant end at one axial end thereof for exposure to the lubricant chamber and a contaminant end at the opposite axial end thereof for exposure to the contaminated environment;

(b) a circular dynamic sealing lip being defined by said circular ring-like seal body and projecting therefrom, said circular dynamic sealing lip having a peripheral sealing surface for sealing engagement with the relatively rotatable surface, said circular dynamic sealing lip defining a hydrodynamic geometry at one axial extremity thereof having an axially varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite axial extremity of said dynamic sealing lip for facing the contaminated environment;

(c) a circular non-lubricated peripheral static sealing surface being defined by said circular ring-like body for static sealing engagement with the housing;

(d) a non-planar flexible transitional heel geometry being defined by said circular dynamic sealing lip having circular intersection with said circular end surface radially remote from said peripheral sealing surface and having circular intersection with said peripheral sealing surface axially remote from said circular end surface; and (e) a lubricant side recessed surface being in opposed relation to said hydrodynamic geometry and defining a static sealing lip being of less axial length than the axial length of said circular ring-like seal body and projecting from said seal body and being located in substantially opposed relation with said dynamic sealing lip.

16. A circular interference type extrusion resistant hydrodynamic seal for location within a circular seal gland of a housing defining a lubricant chamber for dynamic sealing engagement with a relatively rotatable surface and defining a circular clearance with the relatively rotatable surface, and serving as a partition between the lubricant chamber and a contaminated environment and for controlling seal deformation and interfacial contact force between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant end at one axial end thereof for exposure to the lubricant chamber and a contaminant end at the opposite axial end thereof for exposure to the contaminated environment;

(b) a circular dynamic sealing lip being defined by said seal body and projecting radially therefrom, said circular dynamic sealing lip having a peripheral sealing surface for sealing engagement with the relatively rotatable surface, said circular dynamic sealing lip defining a hydrodynamic geometry at one axial extremity thereof having an axially varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite axial extremity of said dynamic sealing lip for facing the contaminated environment;

(c) a circular non-lubricated peripheral static sealing surface being defined by said circular ring-like body for static sealing engagement with said housing;

(d) a non-planar flexible transitional heel geometry being defined by said circular dynamic sealing lip having circular intersection with said circular end surface radially remote from said peripheral sealing surface and having circular intersection with said peripheral sealing surface axially remote from said circular end surface;

(e) means reinforcing said circular ring-like seal body adjacent said non-planar flexible transitional heel geometry to restrain high pressure displacement of said non-planar flexible transitional heel geometry;

(f) a non-planar recess geometry being defined by said circular ring-like seal body and being located in radially opposed relation with said non-planar flexible transitional heel geometry for regulating interfacial contact pressure of said dynamic sealing lip with the relatively rotatable surface in the region of said abrupt axially non varying exclusionary geometry and for regulating lubricant film thickness and net lubricant leakage, and for regulating deformation of said non-planar flexible transitional heel geometry, and for reducing volume of said circular ring-like seal body; and (g) a lubricant side recessed surface being in opposed relation to said hydrodynamic geometry and defining a static sealing lip being of less axial length than the axial length of said circular ring-like seal body and projecting from said seal body and being located in substantially opposed relation with said dynamic sealing lip.

17. A circular interference type extrusion resistant hydrodynamic seal for location within a circular seal gland of a housing defining a lubricant chamber for dynamic sealing engagement with a relatively rotatable surface and defining a circular clearance with the relatively rotatable surface, and serving as a partition between the lubricant chamber and a contaminated environment and for controlling seal deformation and interfacial contact pressure between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant end at one axial end thereof for exposure to the lubricant chamber and a contaminant end at the opposite axial end thereof for exposure to the contaminated environment;

(b) a circular dynamic sealing lip being defined by said circular ring-like seal body and projecting therefrom, said circular dynamic sealing lip having a peripheral sealing surface for sealing engagement with the relatively rotatable surface, said circular dynamic sealing lip defining a hydrodynamic geometry at one axial extremity thereof having an axially varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite axial extremity of said dynamic sealing lip for facing the contaminated environment;

(c) a circular non-lubricated peripheral static sealing surface being defined by said circular ring-like body for static sealing engagement with said housing;

(d) a non-planar flexible transitional heel geometry being defined by said circular dynamic sealing lip having circular intersection with said circular end surface radially remote from said peripheral sealing surface and having circular intersection with said peripheral sealing surface axially remote from said circular end surface; and (e) said circular ring-like seal body having hardness in the range of from 85 durometer nominal Shore A to 90 durometer nominal Shore A.

18. A circular interference type extrusion resistant hydrodynamic seal for location within a circular seal gland of a housing defining a lubricant chamber for dynamic sealing engagement with a relatively rotatable surface and defining a circular clearance with the relatively rotatable surface, and serving as a partition between the lubricant chamber and a contaminated environment and for controlling seal deformation and interfacial contact force between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant end at one axial end thereof for exposure to the lubricant chamber and a contaminant end at the opposite axial end thereof for exposure to the contaminated environment;

(b) a circular dynamic sealing lip being defined by said seal body and projecting therefrom, said circular dynamic sealing lip having a peripheral scaling surface for sealing engagement with the relatively rotatable surface, said circular dynamic sealing lip defining a hydrodynamic geometry at one axial extremity thereof having an axially varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite axial extremity of said dynamic sealing lip for facing the contaminated environment;

(c) a circular non-lubricated peripheral static sealing surface being defined by said circular ring-like body for static sealing engagement with said housing; and (d) a non-planar flexible transitional heel geometry being defined by said circular dynamic sealing lip having circular intersection with said circular end surface radially remote from said peripheral sealing surface and having circular intersection with said peripheral sealing surface axially remote from said circular end surface, the nominal radial and axial dimensions of the non-planar flexible transitional heel geometry having a dimension of 0.030 inch or less.

19. A circular interference type extrusion resistant hydrodynamic seal for location within a circular seal gland of a housing defining a lubricant chamber for dynamic sealing engagement with a relatively rotatable surface and defining a circular clearance with the relatively rotatable surface, and serving as a partition between the lubricant chamber and a contaminated environment and for controlling seal deformation and interfacial contact pressure between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant end at one axial end thereof for exposure to the lubricant chamber and a contaminant end at the opposite axial end thereof for exposure to the contaminated environment;

(b) a circular dynamic sealing lip being defined by said circular ring-like seal body and projecting therefrom, said circular dynamic sealing lip having a peripheral sealing surface for sealing engagement with the relatively rotatable surface, said circular dynamic sealing lip defining a hydrodynamic geometry at one axial extremity thereof having an axially varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite axial extremity of said dynamic sealing lip for facing the contaminated environment;

(c) a circular non-lubricated peripheral static sealing surface being defined by said circular ring-like body for static sealing engagement with the housing;

(d) a non-planar flexible transitional heel geometry being defined by said circular dynamic sealing lip having circular intersection with said circular end surface radially remote from said peripheral sealing surface and having circular intersection with said peripheral sealing surface axially remote from said circular end surface;

(e) a non-planar recess geometry being defined by said circular ring-like seal body and being located in radially opposed relation with said non-planar flexible transitional heel geometry for regulating interfacial contact pressure of said dynamic sealing lip with the relatively rotatable surface in the region of said abrupt axially non varying exclusionary geometry and for regulating lubricant film thickness and net lubricant leakage and for regulating deformation of said non-planar flexible transitional heel geometry, and for reducing volume of said circular ring-like seal body; and (f) a lubricant side recessed surface being in opposed relation to said hydrodynamic geometry and defining a static sealing lip being of less axial length than the axial length of said circular ring-like seal body and projecting from said seal body and being located in substantially opposed relation with said dynamic sealing lip.

20. A circular interference type extrusion resistant hydrodynamic seal for location within a circular seal gland of a housing defining a lubricant chamber for dynamic sealing engagement with a relatively rotatable surface and defining a circular clearance with the relatively rotatable surface, and serving as a partition between the lubricant chamber and a contaminated environment and for controlling seal deformation and interfacial contact pressure between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant end at one axial end thereof for exposure to the lubricant chamber and a contaminant end at the opposite axial end thereof for exposure to the contaminated environment;

(b) a circular dynamic sealing lip being defined by said circular ring-like seal body and projecting therefrom, said circular dynamic sealing lip having a peripheral sealing surface for sealing engagement with the relatively rotatable surface, said circular dynamic sealing lip defining a hydrodynamic geometry at one axial extremity thereof having an axially varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite axial extremity of said dynamic sealing lip for facing the contaminated environment;

(c) a circular non-lubricated peripheral static sealing surface being defined by said circular ring-like body for static sealing engagement with said housing;

(d) a non-planar flexible transitional heel geometry being defined by said circular dynamic sealing lip having circular intersection with said circular end surface radially remote from said peripheral sealing surface and having circular intersection with said peripheral sealing surface axially remote from said circular end surface;

(e) a non-planar recess geometry being defined by said circular ring-like seal body and being located in radially opposed relation with said non-planar flexible transitional heel geometry for regulating interfacial contact pressure of said dynamic sealing lip with the relatively rotatable surface in the region of said abrupt axially non varying exclusionary geometry and for regulating lubricant film thickness and net lubricant leakage and for regulating deformation of said non-planar flexible transitional heel geometry, and for reducing volume of said circular ring-like seal body; and (f) said non-planar recess geometry being of generally conical configuration.

21. A circular interference type extrusion resistant hydrodynamic seal for location within a circular seal gland of a housing defining a lubricant chamber containing a lubricant having a lubricant pressure and for dynamic sealing engagement with a relatively rotatable surface and serving as a partition between the lubricant chamber and a contaminated environment and for controlling seal deformation and interfacial contact pressure between said hydrodynamic seal and the relatively rotatable surface and thus regulating lubricant film thickness between said hydrodynamic seal and the relatively rotatable surface, comprising:

(a) a circular ring-like seal body being composed of resilient material defining a lubricant facing surface at one extremity thereof for exposure to the lubricant chamber and an environment facing surface at the opposite extremity thereof for exposure to the contaminated environment;

(b) a circular dynamic sealing lip being defined by said circular ring-like seal body and projecting therefrom, said circular dynamic sealing lip having a peripheral sealing surface for establishing dynamic sealing engagement and interfacial contact pressure with the relatively rotatable surface, defining a hydrodynamic geometry at one extremity thereof having a positionally varying hydrodynamic edge for facing the lubricant chamber and for hydrodynamically wedging a film of lubricant between said dynamic sealing lip and the relatively rotatable surface and defining an abrupt circular exclusionary geometry at the opposite extremity of said dynamic sealing lip for facing the contaminated environment;

(c) a circular non-lubricated static peripheral sealing surface being defined by said circular ring-like seal body for static sealing engagement with the housing;

(d) a non-planar flexible transitional heel geometry being defined by said circular ring-like seal body having a first circular intersection with said environment facing surface remote from said peripheral sealing surface and having a second circular intersection with said peripheral sealing surface remote from said environment facing surface, said non-planar flexible transitional heel geometry defining a circular unsupported area of said circular ring-like seal body; and (e) wherein said spaced relation between said first circular intersection and said peripheral sealing surface is less than 1/16 inch, and the spaced relation between said second circular intersection and said environment facing surface is less than 0.04 inch to minimize said circular unsupported area of said circular ring-like seal body, thereby minimizing pressure induced distortion of said non-planar flexible transitional heel geometry, and maintaining the interfacial contact pressure within a useful range for hydrodynamic lubrication, and to accommodate changes in seal volume without overfilling the circular seal gland and to provide enhanced extrusion resistance.

22. A circular interference type extrusion resistant hydrodynamic seal for location within a circular seal gland of a housing defining a lubricant chamber containing a lubricant having a lubricant pressure and for dynamic sealing engagement with a relatively rotatable surface and serving as a partition between the lubricant chamber and a contaminated environment and for controlling seal deformation and interfacial contact pressure between said hydrodynamic seal and the relatively rotatable surface and thus regulating lubricant film thickness between said hydrodynamic seal and the relatively rotatable surface, comprising:

(a) a circular ring-like seal body being composed of resilient material defining a lubricant facing surface at one extremity thereof for exposure to the lubricant chamber and an environment facing surface at the opposite extremity thereof for exposure to the contaminated environment;

(b) a circular dynamic sealing lip being defined by said circular ring-like seal body and projecting therefrom, said circular dynamic sealing lip having a peripheral sealing surface for establishing dynamic sealing engagement and interfacial contact pressure with the relatively rotatable surface, defining a hydrodynamic geometry at one extremity thereof having a positionally varying hydrodynamic edge for facing the lubricant chamber and for hydrodynamically wedging a film of lubricant between said dynamic sealing lip and the relatively rotatable surface and defining an abrupt circular exclusionary geometry at the opposite extremity of said dynamic sealing lip for facing the contaminated environment;

(c) a circular non-lubricated static peripheral sealing surface being defined by said circular ring-like seal body for static sealing engagement with the housing;

(d) a non-planar flexible transitional heel geometry being defined by said circular ring-like seal body having a first circular intersection with said environment facing surface remote from said peripheral sealing surface and having a second circular intersection with said peripheral sealing surface remote from said environment facing surface, said non-planar flexible transitional heel geometry defining a circular unsupported area of said circular ring-like seal body;

(e) wherein said spaced relation between said first circular intersection and said peripheral sealing surface is less than 1/16 inch, and the spaced relation between said second circular intersection and said environment facing surface is less than 0.04 inch to minimize said circular unsupported area of said circular ring-like seal body, thereby minimizing pressure induced distortion of said non-planar flexible transitional heel geometry, and maintaining the interfacial contact pressure within a useful range for hydrodynamic lubrication, and to accommodate changes in seal volume without overfilling the circular seal gland and to provide enhanced extrusion resistance; and (f) a non-planar recess geometry being defined by said circular ring-like seal body and being oriented in opposed relation with said non-planar flexible transitional heel geometry, said non-planar recess geometry reducing the volume of said circular ring-like seal body and minimizing interference induced flattening of said non-planar flexible transitional heel geometry, and regulating the interfacial contact pressure near said abrupt circular exclusionary geometry, thereby regulating film thickness and net lubricant leakage.

23. A circular interference type extrusion resistant hydrodynamic seal for location within a circular seal gland of a housing defining a lubricant chamber containing a lubricant having a lubricant pressure and for dynamic sealing engagement with a relatively rotatable surface and serving as a partition between the lubricant chamber and a contaminated environment and for controlling seal deformation and interfacial contact pressure between said hydrodynamic seal and the relatively rotatable surface and thus regulating lubricant film thickness between said hydrodynamic seal and the relatively rotatable surface, comprising:

(a) a circular ring-like seal body being composed of resilient material defining a lubricant facing surface at one extremity thereof for exposure to the lubricant chamber and an environment facing surface at the opposite extremity thereof for exposure to the contaminated environment;

(b) a circular dynamic sealing lip being defined by said circular ring-like seal body and projecting therefrom, said circular dynamic sealing lip having a peripheral sealing surface for establishing dynamic sealing engagement and interfacial contact pressure with the relatively rotatable surface, defining a hydrodynamic geometry at one extremity thereof having a positionally varying hydrodynamic edge for facing the lubricant chamber and for hydrodynamically wedging a film of lubricant between said dynamic sealing lip and the relatively rotatable surface and defining an abrupt circular exclusionary geometry at the opposite extremity of said dynamic sealing lip for facing the contaminated environment;

(c) a circular non-lubricated static peripheral sealing surface being defined by said circular ring-like seal body for static sealing engagement with said housing;

(d) a non-planar flexible transitional heel geometry being defined by said circular ring-like seal body having a first circular intersection with said environment facing surface remote from said peripheral sealing surface and having a second circular intersection with said peripheral sealing surface remote from said environment facing surface, said non-planar flexible transitional heel geometry defining a circular unsupported area of said circular ring-like seal body;

(e) wherein said spaced relation between said first circular intersection and said peripheral sealing surface is less than 1/16 inch, and the spaced relation between said second circular intersection and said environment facing surface is less than 0.04 inch to minimize said circular unsupported area of said circular ring-like seal body, thereby minimizing pressure induced distortion of said non-planar flexible transitional heel geometry, and maintaining the interfacial contact pressure within a useful range for hydrodynamic lubrication, and to accommodate changes in seal volume without overfilling the circular seal gland and to provide enhanced extrusion resistance; and (f) a lubricant side recessed surface being in opposed relation to said hydrodynamic geometry and defining a static sealing lip being of less length than the length of said circular ring-like seal body and projecting from said circular ring-like seal body and being located in substantially opposed relation with said dynamic sealing lip.

24. A circular interference type extrusion resistant hydrodynamic seal for location within a circular seal gland of a housing defining a lubricant chamber containing a lubricant having a lubricant pressure and for dynamic sealing engagement with a relatively rotatable surface and serving as a partition between the lubricant chamber and a contaminated environment and for controlling seal deformation and interfacial contact pressure between said hydrodynamic seal and the relatively rotatable surface and thus regulating lubricant film thickness between said hydrodynamic seal and the relatively rotatable surface, comprising:

(a) a circular ring-like seal body being composed of resilient material defining a lubricant facing surface at one extremity thereof for exposure to the lubricant chamber and an environment facing surface at the opposite extremity thereof for exposure to the contaminated environment;

(b) a circular dynamic sealing lip being defined by said circular ring-like seal body and projecting therefrom, said circular dynamic sealing lip having a peripheral sealing surface for establishing dynamic sealing engagement and interfacial contact pressure with the relatively rotatable surface, defining a hydrodynamic geometry at one extermity thereof having a positionally varying hydrodynamic edge for facing the lubricant chamber and for hydrodynamically wedging a film of lubricant between said dynamic sealing lip and the relatively rotatable surface and defining an abrupt circular exclusionary geometry at the opposite extremity of said dynamic sealing lip for facing the contaminated environment;

(c) a circular non-lubricated static peripheral sealing surface being defined by said circular ring-like seal body for static sealing engagement with the housing;

(d) a non-planar flexible transitional heel geometry being defined by said circular ring-like seal body having a first circular intersection with said environment facing surface remote from said peripheral sealing surface and having a second circular intersection with said peripheral sealing surface remote from said environment facing surface, said non-planar flexible transitional heel geometry defining a circular unsupported area of said circular ring-like seal body;

(e) wherein said spaced relation between said first circular intersection and said peripheral sealing surface is less than 1/16 inch, and the spaced relation between said second circular intersection and said environment facing surface is less than 0.04 inch to minimize said circular unsupported area of said circular ring-like seal body, thereby minimizing pressure induced distortion of said non-planar flexible transitional heel geometry, and maintaining the interfacial contact pressure within a useful range for hydrodynamic lubrication, and to accommodate changes in seal volume without overfilling the circular seal gland and to provide enhanced extrusion resistance; and (f) said circular ring-like seal body having hardness in the range of from 85 durometer nominal Shore A to 90 durometer nominal Shore A.

25. A circular interference type extrusion resistant hydrodynamic seal assembly, comprising:

(a) a housing defining a circular seal gland and at least a portion of a lubricant chamber;

(b) a relatively rotatable surface disposed in rotatable relation with said housing;

(c) a circular interference type extrusion resistant hydrodynamic seal being located within said circular seal gland and serving as a partition between the lubricant chamber and a contaminated environment and for controlling seal deformation and interfacial contact force between said hydrodynamic seal and the relatively rotatable surface and thus regulating lubricant film thickness between said hydrodynamic seal and the relatively rotatable cylindrical surface;

(d) a circular ring-like seal body being composed of resilient material defining a lubricant facing surface at one extremity thereof for exposure to the lubricant chamber and an environment facing surface at the opposite extremity thereof for exposure to the contaminated environment;

(e) a circular dynamic sealing lip being defined by said seal body and projecting therefrom, said circular dynamic sealing lip having a peripheral sealing surface for sealing engagement with said relatively rotatable surface, defining a hydrodynamic geometry at one extremity thereof having a positionally varying hydrodynamic edge for facing said lubricant chamber and for hydrodynamically wedging a film of lubricant between said dynamic sealing lip and said relatively rotatable surface and defining an abrupt axially nonvarying exclusionary geometry at the opposite extremity of said dynamic sealing lip for facing the contaminated environment;

(f) circular non-lubricated peripheral static sealing surface being defined by said circular ring-like body for static sealing engagement with said circular seal gland;

(g) a lubricant side recessed surface being in opposed relation to said hydrodynamic geometry and defining a static sealing lip being of less length than the length of said circular ring-like seal body and projecting from said seal body and being located in substantially opposed relation with said dynamic sealing lip; and (h) wherein projection of said static sealing lip maintains spaced relation between said recessed surface and said circular seal gland, thereby providing void volume to accommodate thermal expansion and swelling of the seal.

26. A circular interference type extrusion resistant hydrodynamic seal for location within a circular seal gland of a housing defining at least a portion of a lubricant chamber and for dynamic sealing engagement with a relatively rotatable surface and serving as a partition between the lubricant chamber and a contaminated environment and for controlling seal deformation and interfacial contact pressure between said hydrodynamic seal and the relatively rotatable surface and thus regulating lubricant film thickness between said hydrodynamic seal and the relatively rotatable cylindrical surface, comprising:

(a) a circular ring-like seal body being composed of resilient material defining a lubricant facing surface at one extremity thereof for exposure to the lubricant chamber and an environment facing surface at the opposite extremity thereof for exposure to the contaminated environment;

(b) a circular dynamic sealing lip being defined by said circular ring-like seal body and projecting therefrom, said circular dynamic sealing lip having a peripheral sealing surface for sealing engagement with the relatively rotatable surface, defining a hydrodynamic geometry at one extremity thereof having a positionally varying hydrodynamic edge for facing the lubricant chamber and for hydrodynamically wedging a film of lubricant between said dynamic sealing lip and the relatively rotatable surface and defining an abrupt axially nonvarying exclusionary geometry at the opposite extremity of said dynamic sealing lip for facing the contaminated environment;

(c) a circular non-lubricated peripheral static sealing surface being defined by said circular ring-like seal body for static sealing engagement with the circular seal gland;

(d) a lubricant side recessed surface being in opposed relation to said hydrodynamic geometry and defining a static sealing lip being of less length than the length of said circular ring-like seal body and projecting from said seal body and being located in substantially opposed relation with said dynamic sealing lip;

(e) wherein projection of said static sealing lip maintains spaced relation between said recessed surface and the circular seal gland, thereby providing void volume to accommodate thermal expansion and swelling of said circular ring-like seal body; and (f) the projection of said static sealing lip is equal to or greater than the projection of said dynamic sealing lip.

* * * * *